United States Patent [19]

Arnold

[11] Patent Number: 5,443,132
[45] Date of Patent: Aug. 22, 1995

[54] MAGNETIC LATCH MECHANISM AND METHOD PARTICULARLY FOR BRAKES

[75] Inventor: James H. Arnold, Moberly, Mo.

[73] Assignee: Orscheln Co., Moberly, Mo.

[21] Appl. No.: 248,258

[22] Filed: May 25, 1994

[51] Int. Cl.$^6$ ................................. B60T 7/12
[52] U.S. Cl. ................................. 188/138; 188/156; 188/161; 188/164; 335/219
[58] Field of Search ............... 188/156, 138, 163, 161, 188/164, 106 A, 78, 325, 166, 171; 335/209, 219, 266, 281; 310/77; 303/20

[56] References Cited

U.S. PATENT DOCUMENTS

| | | | |
|---|---|---|---|
| 2,304,118 | 12/1942 | Phair | 188/138 |
| 2,924,116 | 2/1960 | Abbott | |
| 3,134,463 | 5/1964 | Birge | 188/138 |
| 3,244,259 | 4/1966 | Brede, III et al. | 188/138 |
| 3,668,445 | 6/1972 | Grove | 188/138 X |
| 3,760,909 | 9/1973 | Grove | 188/138 |
| 4,004,262 | 1/1977 | Grove | 335/281 |
| 4,004,663 | 1/1977 | Stibbe | 188/138 X |
| 4,172,242 | 10/1979 | Myers et al. | 335/219 X |
| 5,000,297 | 3/1991 | Shaw et al. | 188/156 |

*Primary Examiner*—Douglas C. Butler
*Attorney, Agent, or Firm*—D. D. McGraw

[57] ABSTRACT

A magnetic latching mechanism and method having permanent magnets and electromagnets arranged to alternately magnetically latch one member to either of two other members using the magnetic flux of the permanent magnets. The magnetic flux of the electromagnets is used to modify the permanent magnetic flux to cancel its magnetic latching to one of the other members and attract the one member to the other of the other members so that the one member is moved to disengage from the one member and engage that other member. The electromagnets are then deenergized and only the permanent magnets' magnetic flux magnetically latches the one member to that other member. The process is reversed to move the one member back into latching engagement with the member with which it in disengaged, magnetically released, relation. The mechanism is disclosed as being used to actuate and release parking brakes by acting on a parking brake actuating arm to move, latch and release that arm. Mechanical assist mechanisms are also disclosed which may be used to assist in the magnetic force instigated movements as needed.

28 Claims, 8 Drawing Sheets

MAGNETIC LATCH MECHANISM AND METHOD PARTICULARLY FOR BRAKES

BACKGROUND OF THE INVENTION

The most extensively produced vehicle service brakes are those on automotive vehicles and trailers towed by automobiles or trucks. These brakes include drum brakes of two major types: leading-trailing, and duo-servo; disc brakes of two major types: fixed-caliper and sliding-caliper; various combinations of these major types; and other less-used types.

One typical combination of two of these types of brakes is that of a disc brake as the service brake, with the brake disc having a hub shaped much like the crown of a hat with the disc braking portion being the brim of the hat. A parking brake in the form of a drum brake is provided within the hat-shaped hub, with the interior cylindrical surface of that hub becoming the drum part of the drum parking brake. In this arrangement the drum brake is dedicated to parking brake functions.

Disc brakes are typically actuated as parking brakes by a threaded or cam device which causes the caliper piston or pistons, and/or the caliper housing itself, to move to engage the disc brake pads with the brake disc in braking relation. The threaded or cam device is usually actuated by an arcuately pivotable lever.

In other combinations, particularly of drum brakes, the parking brake arrangements are commonly integrated with the drum-type service brakes. The background which is most extensive is in the field of such combined parking and service drum brakes typically used on passenger vehicles and light trucks which have rear wheel drum brakes. Therefore, this description of the background of the invention is primarily directed to such brakes.

The parking brake mode of operation of most current drum brakes uses the same brake shoes and brake drum as are used for service braking. In the parking brake mode of operation, those shoes are typically moved by a pivoting internal lever or a cam, coupled to the service brake shoes so that arcuate pivoting movement of the lever or cam causes the shoes to be spread or expanded into braking engagement with the brake drum. A parking brake cable is typically secured to the lever or cam so that when tension force is exerted through the cable, the lever or cam is pivoted to actuate the parking brake.

It is well known to make vehicle service brakes which are actuated by use of a friction material on one end of a brake actuating arm, with an electromagnet also being on that arm end, and the other end of the arm being arranged to move the service brake shoes into engagement with a rotating drum or disc to slow or stop the vehicle when the electromagnet is energized. It is particularly common in the brake art, and especially concerning brakes for recreational vehicle and similar trailers, to use electrically actuated brakes of this type.

Typical patents disclosing electrically actuated brakes include U.S. Pat. Nos. 3,668,445—Grove, issued Jun. 6, 1972; and 3,760,909—Grove, issued Sep. 25, 1973. They have parking brake activation arms, each of which has friction material and an electromagnet on one end so that when the electromagnet is energized the friction material engages a rotatable armature face which rotates with the wheel to be braked. The resultant drag force causes the parking brake activation arm to pivot about its other end, and the brake shoes are spread apart by a cam or spreader bar arrangement on that arm end. Thus the brake shoes are engaged with the brake drum, and apply braking force to the rotating brake drum so long as the electromagnet is energized.

FIELD OF THE INVENTION

The invention relates to mechanisms which are magnetically latched and unlatched, and methods of using and operating such mechanisms. The invention more particularly relates to the latching and unlatching of a control member for a device, the control member being movable to an actuated position and to a released position. The control member when latched is magnetically latched to a second member which may be movable, either actually or incipiently, relative to the control member so that the control member is moved to its device-actuated position and, so long as the control member is magnetically latched to the second member, is urged to and does maintain the device in an actuated position. When the control member is magnetically released from the second member, it is returned by a suitable arrangement, such as a magnetically repellant force between the control member and the second member, to a position wherein it releases the device which it controls. In some arrangements the movements for latching and release are accomplished by control of the magnetic forces in a magnetic assembly to provide the necessary attractive and repelling forces. In other arrangements the movement for either latching or release is accomplished at least in part by an energy-storing device such as a spring or other force accumulator.

In the preferred embodiments herein disclosed and claimed, the invention is illustrated as being employed in a parking brake. The brakes illustrated are automotive vehicle parking brakes incorporated in vehicle service brake assemblies. More particularly, the particular brake illustrated is a drum brake. While it may be of the leading-trailing type or the duo-servo type commonly used in vehicle drum brakes, it is to be understood that at least some versions of the invention may be used in other configurations of drum brakes as well as in disc brakes and combination drum/disc brakes. Brakes embodying the invention may, in their service braking modes, be actuated by fluid pressure such as hydraulic pressure or air pressure, a combination of springs and fluid pressure, mechanically by cams and levers which in turn may be power-actuated and released, or by use of electrical power. Simply put, the manner of service braking actuation is not controlling for selecting the invention as the parking brake actuating and release control. The invention may also be used in a brake for electrical service brake operation and release, such electrically controlled and operated brakes being commonly used on travel trailers, for example.

It is also to be understood that brakes embodying the invention may be brakes for machinery other than automotive vehicles. For example only and not by way of limitation, they may be brakes used in dynamometers, lathes, transmissions, or any device or mechanism which requires the application and release of a brake to a moving or movable part or parts.

SUMMARY OF THE INVENTION

The invention in its broader aspects involves a mechanism having at least two stable states or conditions which are magnetically instigated, controlled and selectively maintained. The mechanism employs a magnetic array comprising one or more permanent magnets and one or more electromagnets in a magnetic assembly. The magnets provide magnetic clamping force or latching power while using electrical power to change the stable states of the magnetic array, and therefore the mechanism, from one stable state to the other.

In the preferred embodiments, the mechanism has a double-acting magnetic array in a magnetic assembly with two operating faces, only one of which is magnetically engaged during either of two stable states. The magnetic array is controlled by one or more electromagnets to place it, and therefore the magnetic assembly and the mechanism, in either one of the two stable states.

In one preferred arrangement, the magnetic assembly includes a magnetic coupling and the two operating faces. That assembly uses magnetic forces, selectively exerted on those two faces by the various magnets making up the magnetic array, to move the magnetic assembly back and forth between the two stable states. In one aspect of the invention, it preferably has a balanced, symmetrical magnetic field assembly or array, and is a totally magnetic design, requiring no springs. In another aspect of the invention, it uses a similar magnetic field assembly in conjunction with an energy-storing device such as a spring or other force-storing and release accumulator to assist the magnetic forces of the magnetic field assembly in moving the magnetic assembly between two stable states. The controllable magnetic forces output of the magnetic array may not only move the magnetic assembly between the two stable states and latch it in one of those stable states, it may also provide the power by which the mechanism being operated via the magnetic assembly is moved to its activated and released modes or conditions.

The magnetic assembly may use a multiple number of electromagnets having magnetic poles created in the armatures thereof when energized. When used in a vehicle parking brake mechanism it is preferred that it use four to six electromagnets having such armatures because of power requirements and space limitations. However, in the practice of the invention, it is not restricted to that number of electromagnets. It may use fewer or more, depending upon the usage, location, space availability and configuration, type of magnetic materials employed, and magnetic power needed for the particular application. For example, two, four and six electromagnets in one magnetic array are shown and described in the drawings and the detailed description of the invention set forth below. It is understood that more than six may be used within the purview of the invention.

The magnetic assembly functions as a magnetic flux pump, moving the magnetic flux from one operating face to the other as the electric currents to the electromagnets control the magnetic power and the polar orientation of the electromagnetic poles, causing the magnetic assembly to move from magnetic engagement with the one operating face to magnetic engagement with the other operating face.

Further details of this feature of the invention, as well as the other aspects, features and embodiments of the invention, are provided in the detailed description of the invention.

An important feature of the invention is the placement and operation of the magnetic fields of both the permanent magnets and the electromagnets in conjunction with the magnetic circuit arrangement. The magnets are so configured that the magnetic fields of the permanent magnets and of the electromagnets operate directly on or with the magnetic fields of each other. The polar arrangement and interrelational physical positioning of the permanent magnets remain constant in the magnetic array, and contribute to this feature. Likewise, the polar arrangements, including consideration of the possible changes in polar orientation, and the interrelational physical positioning of the armatures of the electromagnets in cooperative relation with the permanent magnets also contribute to this feature.

In one preferred type of usage as an electrically controlled parking brake, the mechanism, with its electrical wiring, may replace the mechanical brake cable or cables through which parking brake apply and release forces are mechanically applied to the parking brake activation arm. It controls the parking brake with the magnetic assembly. It uses a magnetic backing plate attached to the more freely movable end of the parking brake activation arm. This permits replacement of the currently-used brake cables with control wires connected to the magnetic assembly of the invention.

A mechanism embodying the invention in such a preferred type of usage may comprise, in various combinations, the following elements: a parking brake activation arm; an electromagnetic assembly comprising a magnetic array having pole pieces, electromagnets, a first magnetic backing plate assembly which may have friction material on a friction backing plate, a connector/terminator card, and a wear surface; a second magnetic backing plate assembly attached to the outboard end of the activation arm and containing an electromagnetic assembly mount or a guide for movement of the electromagnetic assembly, with either or both of the first and the second magnetic backing plate assemblies also including permanent magnets and a filler plate; operating faces arranged to be selectively within and without the magnetic field of the electromagnetic assembly; and control means for selectively energizing and deenergizing the electromagnets of the electromagnetic assembly so as to manipulate the magnetic field of the permanent magnets in relation to the operating faces.

In some embodiments of the invention the electromagnetic assembly is movable within the guide in which it is mounted as it goes from one stable state to the other stable state. In other embodiments the end of the control arm on which the electromagnetic assembly is mounted moves with the electromagnetic assembly as its controlled magnetic field moves it from one stable state to the other stable state. In some such arrangements, the movement of the electromagnetic assembly from one of the stable states to the other of the stable states may be augmented by a force-storing and releasing device such as a spring.

A brake embodying the invention may be applied by drum-rotationally-generated force, or may be applied by controlled electromagnetic force, or a combination of the two.

In still other embodiments of the invention, the brake may have a mechanically operated parking brake apply and release arrangement which can act to assist the magnetic assembly in moving from one of the stable states to the other of the stable states. Such a mechanically operated parking brake apply and release arrangement may be used as an assist for the magnetic array arrangement, and may also function as a backup arrangement to mechanically apply and release the parking brake if for any reason the electromagnetic system is unable to do so. Such an arrangement may incorporate various features of the other embodiments of the invention herein disclosed.

The invention in its broader aspects is directed to a magnetic latch mechanism comprising a first member, a second member and a third member, with at least one of said members being movable and at least one of said members being fixed. All of the members are capable of having magnetic flux passing therethrough. At least one of the members is a magnetic array comprising a plurality of magnets, at least one of which is a controllable electromagnet and another of which is a permanent magnet positioned in magnetically cooperative relationship. The latch mechanism has a plurality of alternately establishable stable conditions including first and second magnetic latching positions. One of the alternately establishable stable conditions includes the first magnetic latching position in which the first member is magnetically latched to the second member and a second one of the alternately establishable stable conditions includes the second magnetic latching position wherein the first member is magnetically latched to the third member.

In other broader aspects of the invention the magnetic latch mechanism includes a first member, a fixed member, a movable member movable relative to the fixed member and the first member, and a magnetic array forming a part of the first member. The magnetic array has controllable magnetic characteristics for moving the magnetic array between the first and second member latching positions by magnetically attractive forces acting between the magnetic array and the one of said fixed and movable members toward which the magnetic array is moving. The magnetic latching mechanism has first and second alternate stable conditions which respectively include the first and second magnetic latching positions. The first alternate stable condition includes the first magnetic latching position in which the first member is magnetically latched only to the fixed member by magnetic attraction between the magnetic array and the fixed member. The second alternate stable condition includes the second magnetic latching position in which the first member is magnetically latched only to the movable member by magnetic attraction between the magnetic array and the movable member.

In other aspects of the invention, the magnetic latch mechanism of the invention includes a magnetic array which has a plurality of permanent magnets and magnetically soft electromagnet armatures, the armatures being magnetically and physically interconnected with the permanent magnets at the permanent magnet pole ends so as to be magnetically effective parts of permanent magnets. The permanent magnets and the armatures of the electromagnets are arranged to define a magnetic matrix having predetermined magnetic flux characteristics in accordance with the polar arrangement and interrelated physical positioning of the permanent magnets. This magnetic matrix it one that exists when and while the electromagnets are deenergized, and therefore only the magnetic flux of the permanent magnets is active. This magnetic matrix includes the magnetic flux circuit set up in the magnetic array and the magnetic-flux-conductive portion of the physically and magnetically engaged one of the fixed member or the movable member, so engaged by the magnetic array.

In more particular aspects of the invention, the permanent magnets and the armatures are preferably rod-like in shape with the magnetic north and magnetic south poles of each permanent magnet being at opposite ends thereof. Each of the permanent magnets has one armature secured to its north magnetic pole and another armature secured to its south magnetic pole in magnetic-flux-conductive relation. The armatures extend transversely of the permanent magnets to form a substantially "I" configuration.

BRIEF DESCRIPTION OF THE DRAWINGS

FIG. 13 illustrates the magnetic assembly and the additional features of the brake assembly by the removal of certain parts that obscure the area of particular interest in FIG. 12.

DESCRIPTION OF THE PREFERRED EMBODIMENTS

Figures 1, 2:
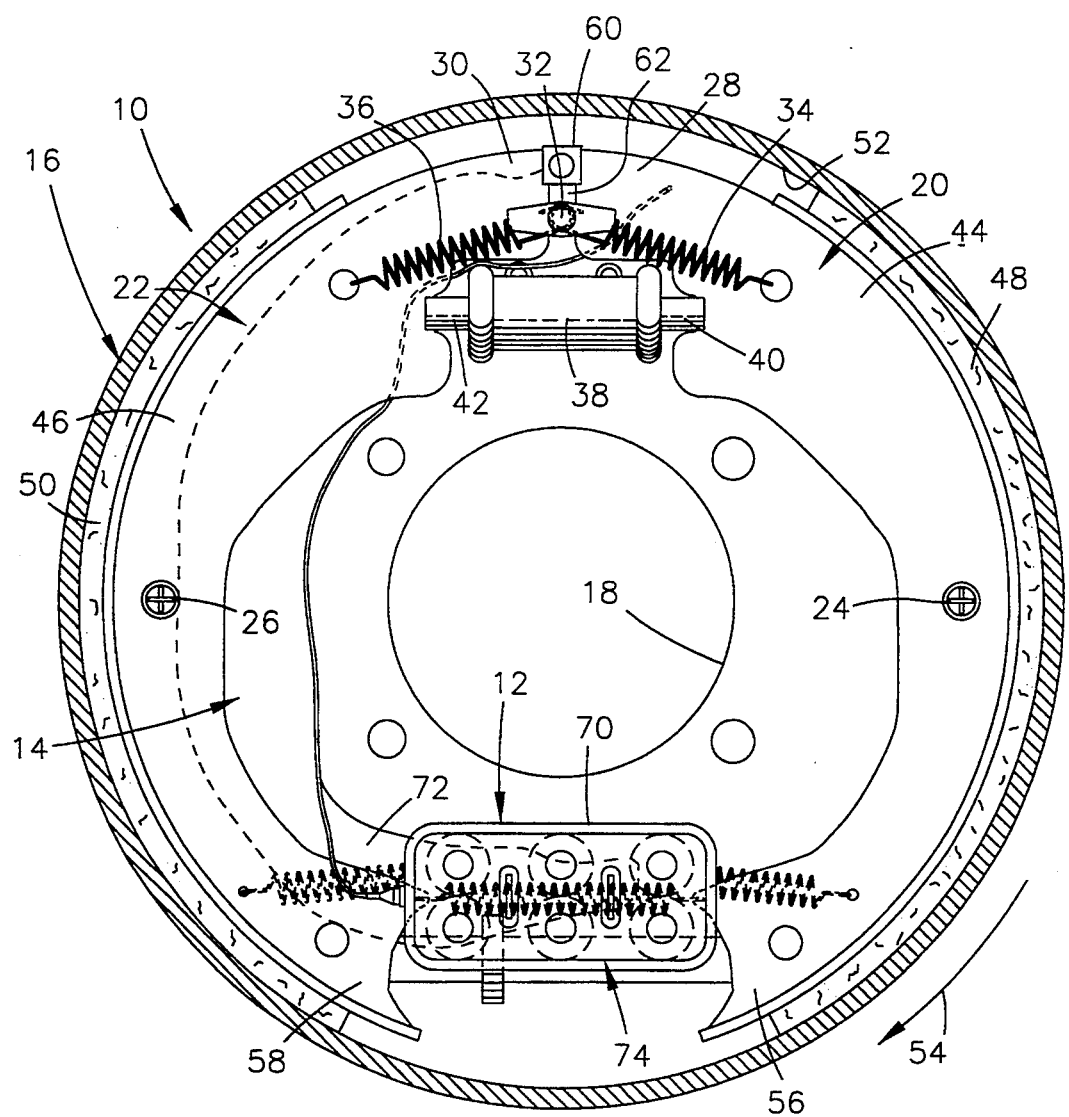
FIG. 1 is a side elevation view of a typical duo-servo drum brake assembly with a magnetic assembly embodying the invention provided in place of the conventional parking brake cable connection to one end of the parking brake activation arm.
FIG. 2 is an enlarged elevation view of the magnetic assembly of FIG. 1.

The wheel brake assembly 10 of FIG. 1 is a typical duo-servo drum brake, except for the magnetic assembly 12 and a modified parking brake activation arm 14. A rotatable brake drum 16 is secured to a vehicle wheel (not shown) for rotation with the wheel. A brake assembly backing plate 18 is secured to the axle housing (not shown) so as to be relatively fixed against movements in relation to the vehicle. A primary brake shoe 20 and a secondary brake shoe 22 are mounted on the backing plate 18 by means of hold-down spring assemblies 24 and 26. The upper adjacent ends 28 and 30 of the brake shoes 20 and 22 are in engagement with the anchor pin 32, which is mounted on the backing plate 18. Brake shoe return springs 34 and 36 are respectively attached to the brake shoes 20 and 22 at one spring end and are attached to the anchor pin 32 at the other spring end. They are in tension, and therefore continually urge the brake shoe ends 28 and 30 toward engagement with the anchor pin 32. A wheel cylinder 38 is mounted on the backing plate 18 and has its oppositely-extending pins 40 and 42 respectively engaging the webs 44 and 46 of the respective brake shoes 20 and 22, near but spaced from the brake shoe ends 28 and 30.

As is well known in the art, when fluid pressure is introduced into the wheel cylinder 38 the pistons (not shown) in that cylinder move the pins 40 and 42 axially outward in opposite directions, effectively axially expanding the wheel cylinder 38 and moving the brake shoe ends 28 and 30 arcuately away from the anchor pin 32 until the brake shoe linings 48 and 50 engage the inner surface 52 of the brake drum 16. The primary shoe 20 then tends to move arcuately in the direction of rotation of the brake drum, indicated by arrow 54, with its other end 56 pushing through the brake adjuster screw (not shown, being hidden behind the magnetic assembly 12 in FIG. 1) to the other end 58 of the secondary shoe 22, causing the secondary shoe to move arcuately against pin 42 and again engaging the shoe end 30 with the anchor pin. The mechanical multiplication of braking force by this action of the primary shoe on the secondary shoe is the second servo action of a duo-servo brake, the hydraulic action of the wheel cylinder being the first servo action.

If the brake is of the leading-trailing type, the ends 56 and 58 of the shoes engage an anchor fixed to the backing plate, and only servo action of the wheel cylinder on the shoes is obtained. The invention may be employed with either type of drum brake.

Parking brakes are usually provided on the rear wheels of an automotive vehicle. When the brakes for these wheels are drum brakes, the service brake shoes are separately actuated for parking purposes. A parking brake activation arm is typically provided. It is either pivoted on the anchor pin or the end of a spreader strut extending between the shoe webs near the shoe ends 28 and 30. If the spreader strut is used, it is typically located under the wheel cylinder as seen in FIG. 1, has forked ends receiving parts of the shoe webs 44 and 46 at notches in the shoe webs, with the parking brake activation arm also received in the forked end engaging the shoe web 46 of the secondary shoe 22. Alternatively, and in the instance illustrated in FIG. 1, a cam 60 may be provided on the end 62 of the parking brake activation arm 14 near the anchor pin 32. Cam 60 may be square or rectangular, or have an S-shape, by way of example. For simplicity, it is here shown as a square. The opposite sides of the cam 60 are engaged by the shoe ends 28 and 30, so that as the parking brake activation arm 14 is pivoted about the anchor pin, the shoe ends 28 and 30 are spread apart, engaging the shoe linings 48 and 50 with the inner surface 52 of the brake drum 16, actuating the brake in the parking brake mode.

In the typical duo-servo brake, the parking brake activation arm is located in close conjunction with the primary brake shoe 20 (or the equivalent leading brake shoe in a leading-trailing brake), and a parking brake cable is attached to the end of the parking brake activation arm which is circumferentially opposite to the wheel cylinder and anchor pin. Thus in such a typical brake the parking brake activation arm would be located adjacent to the web 44 of the primary shoe 20, and the parking brake cable, when tensioned to apply the parking brake, would pull the activation arm lower end leftwardly as seen in FIG. 1, spreading the shoes apart as earlier described to activate the parking brake mode.

In a brake embodying the invention as illustrated in FIG. 1, the parking brake activation arm may be located adjacent either shoe web 44 or shoe web 46. It is illustrated as being adjacent shoe web 46 of the secondary shoe 22. Instead of having an arrangement connecting the end of a parking brake cable to the activation arm, as shown in U.S. Pat. No. 2,924,116—Abbott, for example, the magnetic assembly 12 is provided on the end of the activation arm. This general arrangement is disclosed in U.S. Pat. Nos. 2,304,118—Phair; 3,134,463—Birge; 3,244,259—Brede III, et al; 3,668,445—Grove; 3,760,909—Grove; and 4,004,262—Grove, by way of example.

Figure 3:
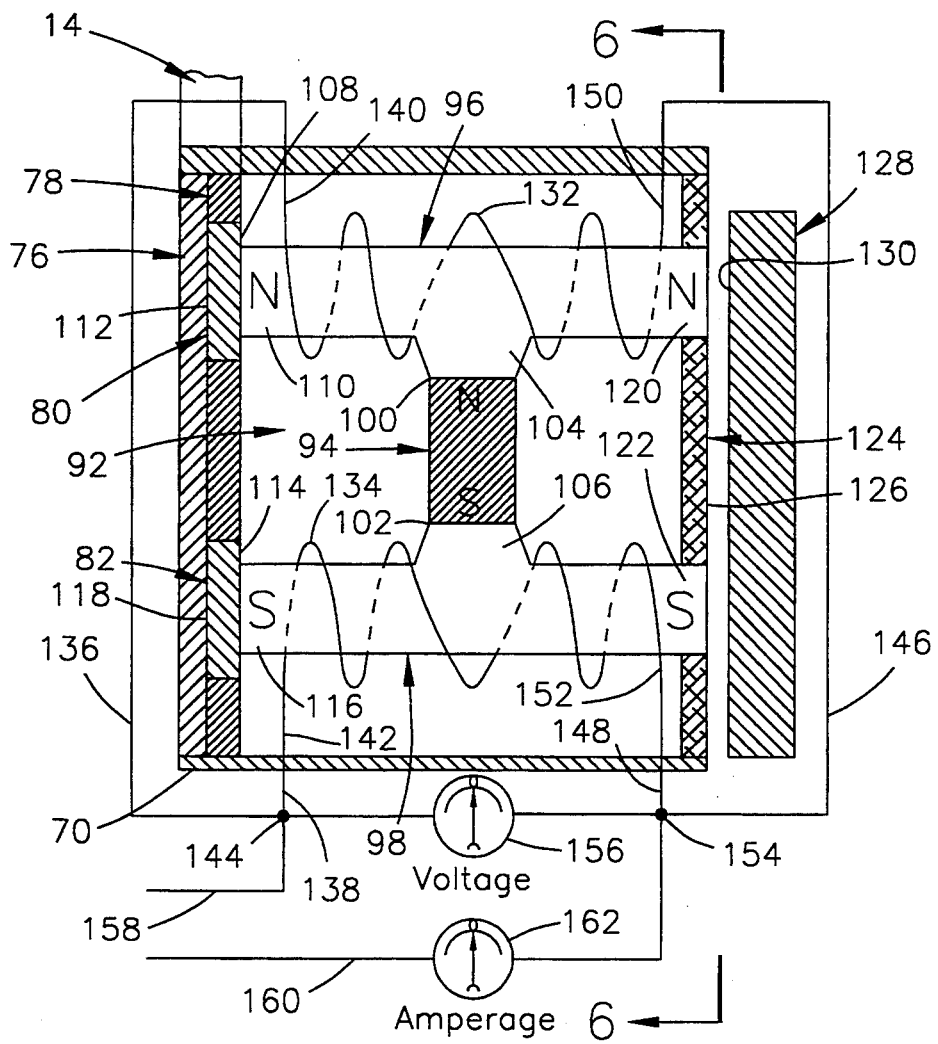
FIG. 3 is a schematic representation of a cross section of the magnetic assembly of FIG. 2 taken in the direction of arrows 3—3 of that FIGURE.

The magnetic assembly 12 includes an open housing and guide frame 70 mounted on the end 72 of the parking brake activation arm 14 opposite the arm end 62 so that it is an extension of that arm. Because of the orientation of the brake assembly 10 shown in FIG. 1, parking brake activation arm end 72 is referred to as the lower end of that arm. In its operational orientation, however, the brake assembly may not actually have this arm lower end 72 positioned lower than the arm end 62. The housing and guide frame 70 is shown in FIGS. 1 and 3, but is omitted in the other FIGURES. It provides a mounting and a slidable guide frame for the magnetic array 74, which is a part of the magnetic assembly 12. The array, including variations of it, are shown in FIGS. 1–4 and 6–8. The magnetic assembly 12 also includes a magnetic backing plate 76, which is either a part of or attached to the housing and guide frame 70 and is therefore effectively a part of the activation arm 14 as well as a part of magnetic assembly 12.

A non-magnetic filler plate 78 is secured in the housing and guide frame 70 and the magnetic backing plate 76, as shown in FIG. 3. Backing plate magnets 80 and 82 are shown in FIG. 3 as being imbedded in filler plate 78 so as to have one magnetic pole of each backing plate magnet engaging the magnetic backing plate 76 and the other magnetic pole of each such magnet being flush with the side of filler plate 78 opposite the magnetic backing plate 76. In an electromagnet six-armature or six-pole magnetic assembly such as that shown in FIGS. 1, 2 and 6, there are additional backing plate magnets 84, 86, 88 and 90. In an electromagnet four-armature or four-pole magnetic assembly such as that schematically shown in FIG. 7, there are only four backing plate magnets, such as magnets 80, 82, 84, and 86. In an electromagnet two-armature or two-pole magnetic assembly such as that schematically shown in FIG. 8, only backing plate magnets 80 and 82 are used. As can be readily deduced, there is one backing plate magnet for each electromagnet pole or armature in the magnetic assembly. Thus if more than six electromagnet armatures or poles are used, then the same additional number of backing plate magnets would be used. All of the backing plate magnets serve primarily as conductors of magnetic fluxes between the backing plate 76 and the respective adjacent ends of the adjacent electromagnets. These magnetic fluxes may be those inherent in permanent magnets such as 94 alone, or the combined flux effect of those magnets and the electromagnets.

Figure 4:
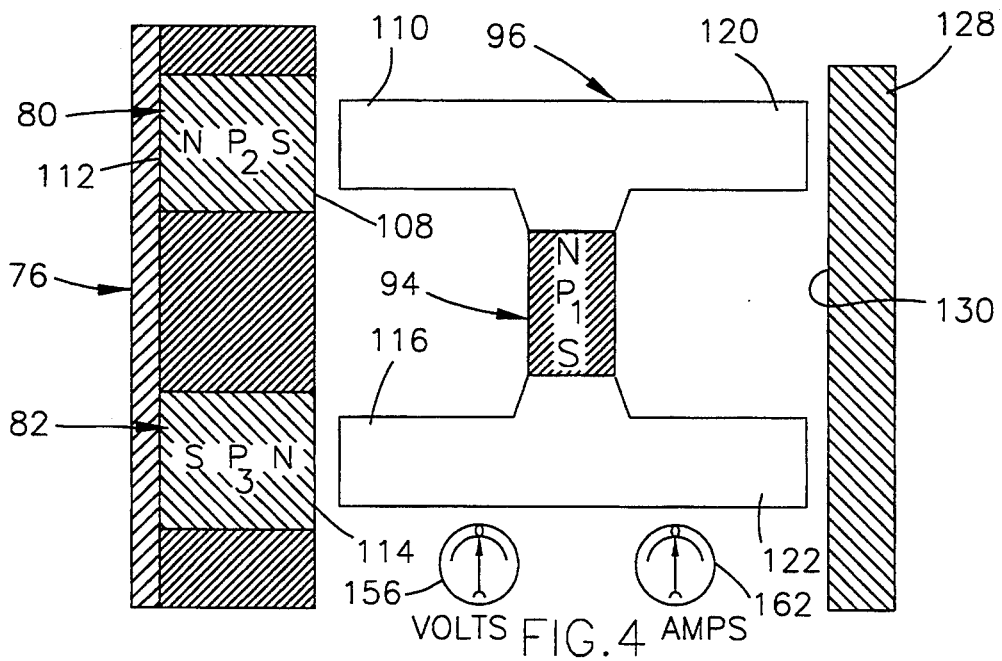
FIG. 4 is a simplified schematic representation of FIG. 3, provided for explanatory purposes in conjunction with a table of data presented below in the detailed description.

The movable magnetic array 74 is schematically illustrated in FIGS. 3 and 4. These views are effectively cross sections taken so as to show one magnet set 92 of the magnetic array. Magnet set 92 includes a permanent magnet 94, which extends axially parallel to the backing plate 76, two electromagnet armatures or poles 96 and 98, which are physically and magnetically connected to the permanent magnet 92 at junctures 100 and 102, respectively.

Electromagnet armatures or poles 96 and 98 respectively have magnet connector extensions 104 and 106 extending transversely at the longitudinal centers of the poles so that the extension outer end surfaces are at the junctures 100 and 102, contacting the end surfaces of the permanent magnet 94 physically and magnetically. Armatures or poles 96 and 98 are effectively magnetically soft bars or rods which are perpendicular to the rod-like permanent magnet 94 and also to the magnetic backing plate 76. They are respectively in axial magnetic alignment the backing plate permanent magnets 80 and 82.

Electromagnet armature or pole 96 of magnet set 92 is a magnetic North pole in FIG. 3 since it is magnetically connected to the magnetic North pole of permanent magnet 94. Therefore, the backing plate magnet 80 has its magnetic South pole on its face 108 positioned for engagement with the end 110 of electromagnet armature or pole 96, and its magnetic North pole on its face 112, which is in physical and magnetic engagement with the backing plate 76.

Electromagnet armature or pole 98 of magnet set 92 is a magnetic South pole in FIG. 3 since it is magnetically connected to the magnetic South pole of permanent magnet 94. Therefore, the backing plate magnet 82 has its magnetic North pole on its face 114 positioned for engagement with the end 116 of electromagnet pole 98, and its magnetic South pole on its face 118, which is in physical and magnetic engagement with the backing plate 76.

Electromagnet poles or armatures 96 and 98 respectively have pole ends 120 and 122 which are axially opposite their respective ends 110 and 116. Pole ends 120 and 122 extend through the pad 124 of friction material. Pad 124 is parallel to the backing plate 76, and has its friction face 126 on its outer side opposite the permanent magnet 94 and backing plate 76. The outer faces of pole ends 120 and 122 are in the plane of the pad friction face 126.

The hub 128 of the brake drum 16 is spaced axially slightly away from the friction face 126, and has an annular friction surface 130 which is selectively engageable with the friction face 126 of pad 124, as will be later described. The normal space between friction face 126 and friction face 130, when the electromagnet pole ends 110 and 116 are in physical contact with backing plate magnets 80 and 82, as schematically shown in FIG. 3, is about 0.040 to 0.060 inches. As the friction material of pad 124 wears because of use, this space will increase accordingly. Therefore, the movements of the magnet set 92 from left to right, and from right to left, as viewed in FIG. 3, are about 0.040 to 0.060 inches (about 1 to 1.5 mm) in the normal condition, and increases in accordance with the wear of the friction material of pad 124 and the ends 120 and 122 of electromagnetic armatures or poles 96 and 98. As will be later described, when the electromagnetic pole ends 110 and 116 are in physical and magnetic engagement with the faces 108 and 110, respectively, or backing plate magnets 80 and 82, the parking brake is in the released mode. When the electromagnetic pole ends 120 and 122, and the friction face 126 of pad 124, are in engagement with the annular friction face 130 of hub 128 (the engagement being both physical and magnetic in the case of the pole ends 120 and 122), the parking brake is in the applied mode.

As shown in FIG. 3, electric winding 132 is wound about electromagnet armature 96 in one direction, and electric winding 134 is wound about electromagnet armature 98 in the opposite direction. The windings are in parallel, with electrical leads 136 and 138 respectively connecting the ends 140 and 142 of the windings 132 and 134 to electrical junction 144, and electrical leads 146 and 148 respectively connecting the ends 150 and 152 of the windings 132 and 134 to electrical junction 154. A voltmeter 156 is connected between junctions 144 and 154, and indicates the voltage being supplied to the electrical windings 132 and 134. Electricity is supplied to junctions 144 and 154 by electrical leads 158 and 160. An ammeter 162 is in electrical lead 160, and indicated the amperage being supplied to the electrical windings 132 and 134. The description below of the circuitry in FIG. 5 covers the controls for the electrical power to the electrical windings 132 and 134 of the electromagnets of the magnetic assembly 12, as well as other electrical windings for additional electromagnets of the magnetic array when such additional electromagnets are used.

While the schematic presentation in FIG. 3 does not show it, the movable magnet sets, herein also referred to as a magnetic array, may be encased in a suitable material commonly used in such electrical devices so that the movable magnet sets are easily fitted as a unit into the open housing and guide frame 70 and are movable in that housing and guide frame as they move from the parking brake release mode to the parking brake apply mode and vice versa.

Figure 7:
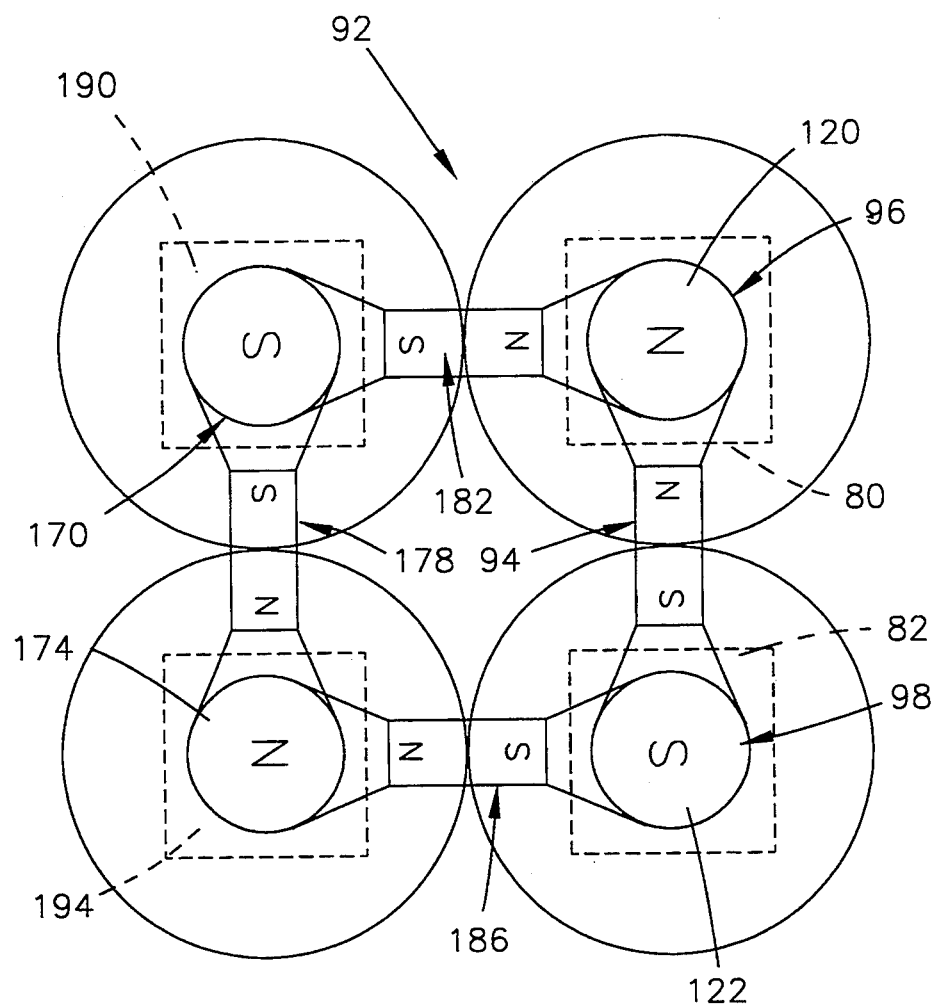
FIG. 7 is an elevation view similar to FIG. 6, illustrating a four-pole magnetic assembly embodying the invention.
Figure 8:
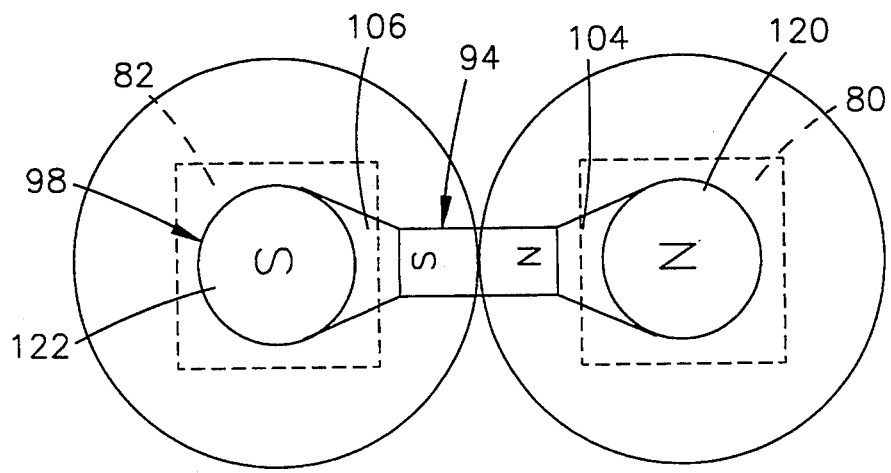
FIG. 8 is an elevation view similar to FIG. 6, illustrating a two-pole magnetic assembly embodying the invention.

If the movable magnetic assembly employs only two electromagnets, referred to herein electromagnetic two-pole magnet set, then the magnetic array is arranged as shown in FIG. 8, and only the two electromagnetic armatures 96 and 98 and their respective electric windings 132 and 134, which with the two electromagnetic poles define two electromagnets, with the one permanent magnet 94, are used. If the movable magnetic assembly employs an electromagnetic four-pole magnet array, the permanent magnets and the electromagnets in that array are arranged as illustrated in FIG. 7. If the movable magnetic assembly employs an electromagnetic six-pole magnet array, the permanent magnets and the electromagnets in that array are arranged as illustrated in FIG. 6.

Figure 6:
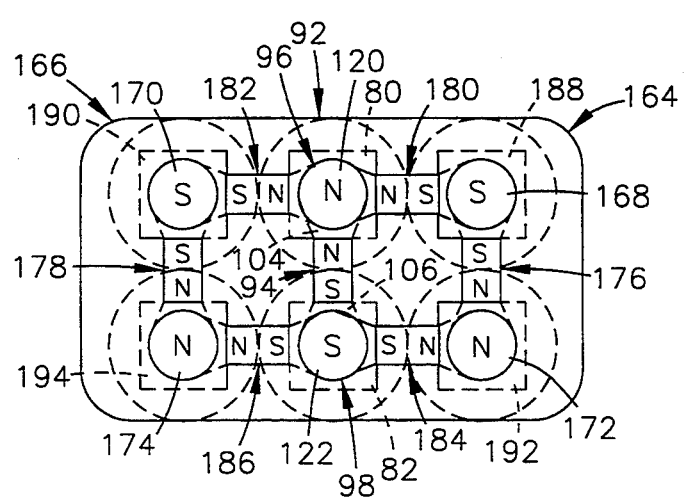
FIG. 6 is an elevation view, with parts in section, taken in the direction of arrows 6—6 of FIG. 3, illustrating a six-pole magnetic assembly embodying the invention.

In FIG. 6, the magnet set 92 illustrated in FIG. 3 containing backing plate magnets 80 and 82, permanent magnet 94, electromagnet armatures or poles 96 and 98, windings 132 and 134, and suitable potting material is shown in the center section. Similar magnet sets 164 and 166 are positioned on either side of magnet set 92. The electromagnet pole ends 168 and 170, comparable to armature or pole 96, are magnetically South poles, and the electromagnet armature or pole ends 172 and 174 are magnetically North poles. Similarly, the permanent magnets 176 and 178 of magnet sets 164 and 166 are in magnetically reversed positions relative to permanent magnet 94 so that their magnetic South poles are respectively physically and magnetically connected to the electromagnetic South poles 168 and 170, and their magnetic North poles are respectively physically and magnetically connected to the electromagnetic North poles 172 and 174.

In addition, a permanent magnet 180 is physically and magnetically connected with electromagnetic armatures or poles 96 and 168, the magnetic North pole of permanent magnet 180 being so connected to the magnetically North pole 96 and the magnetic South pole of permanent magnet 180 being so connected to the magnetically South pole 168. Also, a permanent magnet 182 is physically and magnetically connected with electromagnetic armatures or poles 96 and 170, the magnetic North pole of permanent magnet 182 being so connected to the magnetically North pole 96 and the magnetic South pole of permanent magnet 182 being so connected to the magnetically South pole 170.

Furthermore, a permanent magnet 184 is physically and magnetically connected with electromagnetic armatures or poles 98 and 172, the magnetic South pole of permanent magnet 184 being so connected to the magnetically South pole 98 and the magnetic North pole of permanent magnet 184 being so connected to the magnetically North pole 172. Likewise, a permanent magnet 186 is physically and magnetically connected with electromagnetic armatures or poles 98 and 174, the magnetic South pole of permanent magnet 186 being so connected to the magnetically South pole 98 and the magnetic North pole of permanent magnet 186 being so connected to the magnetically North pole 174.

In a similar vein, and in accordance with the pattern of magnetic pole orientations shown in FIG. 3, backing plate permanent magnets 188, 190, 192 and 194 have their North and South magnetic poles arranged so that their poles that are respectively physically and magnetically engageable with ends of the electromagnetic armatures or poles 168, 170, 172 and 174 are of opposite polarity from the polarity of those respective electromagnetic poles.

FIG. 8 shows a magnetic array using a magnet set with only two electromagnetic armatures or poles, and therefore is the same as the schematic representation of FIG. 3.

Figure 5:
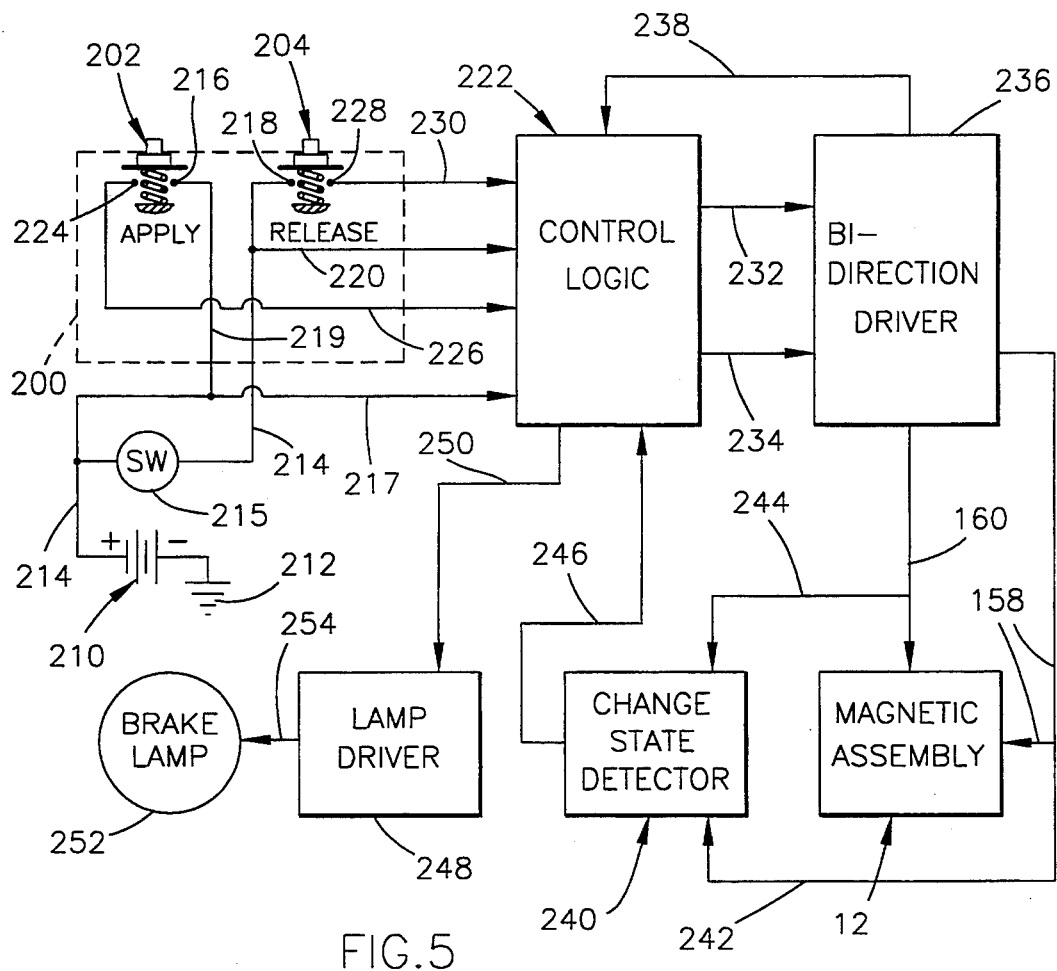
FIG. 5 is a schematic electrical diagram showing the control system for the magnetic assembly of FIGS. 1, 2, and 3.

FIG. 5 is a schematic diagram of the control and indication system connected to the magnetic assembly 12. The control panel 200 is positioned so that it can be observed and operated by an operator of the equipment in which the magnetic assembly 12 is installed. It includes apply and release control switches 202 and 204. A source of electricity is schematically represented as a battery 210, with the negative pole being grounded at 212. The positive pole is electrically connected to electrical lead 214 containing a switch such as ignition switch 215, after which lead 214 enters the control panel 200. Within the panel lead 214 is electrically connected to contact 218 of switch 204. Between the ignition switch 215 and the contact 218 electrical lead 214 is also electrically connected to electrical lead 220, which is electrically connected to the control logic 222. Control logic 222 is shown as having several different areas receiving electrical power under various circumstances. It is to be understood that the different areas of control logic 222 receiving electrical power through various electrical leads provide different functional controls within the control logic so that appropriate electrical power signals are generated and sent to other parts of the system by various other electrical leads connected within the control logic at appropriate places for those purposes.

Contact 224 of switch 202 is electrically connected to electrical lead 226, which is also electrically connected to the control logic 222. Lead 214 has a branch lead 217 which is electrically connected to the lead 214 between the battery positive pole and the ignition switch 215, and also to the control logic 222. Another branch lead 219 electrically connects branch lead 217 and contact 216 of switch 202. Contact 228 of switch 204 is electrically connected to electrical lead 230, which is also electrically connected to the control logic 222.

The electrical output signals and power from control logic 222 are transmitted through electrical leads 232 and 234 to the bi-directional driver 236. The output signals and power from driver 236 are transmitted to the magnetic assembly through electrical leads 158 and 160. Electrical feedback output from driver 236 is provided to the control logic 222 through electrical lead 238. A change state or latch-up detector 240 is electrically connected to lead 158 by electrical lead 242 and to lead 160 by electrical lead 244. Electrical output signals from change state detector 240 are transmitted to the control logic 222 through electrical lead 246. Control logic 222 generates another electrical signal, in response to the apply mode of the magnetic assembly 12 occurring, and that signal is delivered to the lamp driver 248 through electrical lead 250. The lamp driver 248 then energizes the brake lamp 252 with electrical power transmitted through electrical lead 254. Lamp 252 is appropriately located so as to be observed by the operator of the system. When the magnetic assembly 12 is not in the apply mode, there is no electrical signal from control logic 222 through electrical lead 250, and lamp driver 248 does not energize brake lamp 252. This lack of energization indicates that the magnetic assembly is not in the apply mode, but is in the release mode.

Switch contact 216 is always provided with electrical power directly from battery 210 through electrical leads 214, 217 and 219. One part of control logic 222 is also provided with electrical power directly from battery 210 through electrical leads 214 and 217. Upon starting the vehicle by closing the ignition switch 215, electricity is provided to another part of control logic 222 through electrical leads 214 and 220. Electricity from battery 210 is provided to switch contact 218 through electrical lead 214 and the closed ignition switch 215. Control logic 222 generates a reduced voltage pulse to the magnetic assembly 12 upon its receipt of electrical power through electrical lead 220. The change state detector 240 monitors the pulse and determines whether the applied or released status of the parking brake, as controlled by the magnetic assembly 12, exists. The electronics of the control logic 222 will then set the correct status on the brake lamp 252 by energizing the brake lamp. Typically, the brake lamp indicator remains energized so long as the ignition switch 215 is on and in position to energize the starter circuit for starting the vehicle engine. The part of the control logic 222 generating the apply mode signal in electrical lead 250 is dependent upon electrical power received by the control logic through electrical lead 220, and that power must pass through the ignition switch 215 when that switch is closed and has energized the starter circuit. Thus the control logic is arranged to sense activation of the starter circuit by the closure of switch 215 so that the indicator 252 can be energized only during the engine cranking phase. Other alternatives for sensing the apply mode condition of the magnetic assembly 12, and therefore of the parking brake, include magnetic sensors at each of the magnetic backing plates which sense which of those backing plates is functioning as a magnetic shunt, thus functioning as the change state or latch-up detector 240.

The change state detector 240, or its equivalent such as noted above, detects changes in the electrical or magnetic circuity that occur when a magnetic shunt has been established, either to establish a parking brake applied condition or a parking brake released condition. When it detects such a change, its output signal to the control logic 222 causes the control logic to deenergize the electromagnets of the magnetic assembly 12 and change the indicator 252 to the appropriate indication. The result in the magnetic assembly is that only the magnetic flux from the permanent magnets in the magnetic assembly maintain the magnetic shunt and therefore the parking brake applied or released status. Thus no electrical current to the magnetic assembly is required for such maintenance.

When normally open switches 202 and 204 are both open, the control logic 222 does not generate a power signal, other than the initial start-up pulse described above, to the bidirection driver 236, and no power signal (again, other than when the initial start-up pulse described above is momentarily generated) is transmitted to the magnetic assembly 12. There is no electrical signal or power, as would be indicated by zero voltage and zero amperage, in the electrical leads 158 and 160. Therefore, none of the electromagnets in the magnetic assembly 12 are energized.

Assuming that initially there is a theoretical centrally-located ("neutral") position of the movable magnetic array in which the electromagnet ends 110 and 116 are axially spaced from the magnet faces 108 and 114, and the electromagnet ends 120 and 122 are also axially spaced from the friction face 130 of the drum hub 128 by the same distance, the position of the movable magnetic array would be like that schematically shown in FIG. 4. Of course, this is only a theoretical position, because the permanent magnetism from permanent magnet 94 would cause the movable magnetic array to be moved either leftwardly or rightwardly until there are physical and magnetic connections between an end of electromagnetic armature or pole 96 and either magnet face 108 or friction surface 130 of hub 128, and between an end of electromagnetic pole 98 and either magnet face 114 or friction surface 130 of hub 128. Further explanatory analysis will assume that the theoretical centrally-located "neutral" position is the starting point, however.

In referring to FIG. 4 for this analysis, the magnetic fluxes at various locations in the magnetic array under various defined conditions are described. The following identifications are therefore used:

$P_1N$ is the location of magnetic flux at the North pole of permanent magnet 94.

$P_1S$ is the location of magnetic flux at the South pole of permanent magnet 94.

$P_2N$ is the location of the magnetic flux at the North pole of permanent magnet 80.

$P_2S$ is the location of the magnetic flux at the South pole of permanent magnet 80.

$P_3N$ is the location of the magnetic flux at the North pole of permanent magnet 82.

$P_3S$ is the location of the magnetic flux at the South pole of permanent magnet 82.

This analysis of the function of the mechanism assumes that there is a starting "neutral" position as schematically shown in FIG. 4, in which the electromagnetic pole ends 110 and 116 are spaced from their adjacent magnets 80 and 82, and electromagnetic pole ends 120 and 122 are spaced from the adjacent face 130 of the hum 128 of the brake drum 16. No electrical current is being provided to any of the electromagnet poles. Therefore, the voltmeter 156 and the ammeter 162 are at zero, and there is no magnetic flux being created in the electromagnet poles by an electrical current. Because of the separation of the electromagnet pole ends in relation to the permanent magnets 80 and 82 and the brake drum hub 128, there is no substantial magnetic flux flowing through either the backing plate 76 or the brake drum hub 128.

From the theoretical neutral condition of the magnetic array 74, shown schematically in FIG. 4, the electromagnet coils around armatures 96 and 98 are energized by passing electrical current through the windings 132 and 134, causing the positive, or North, magnetic flux at pole end 110 (which was positive in the neutral position because of the magnetic flux of the permanent magnet 94) to become greater positive, or North, in polarity. This current also causes the negative, or South, magnetic flux at pole end 116 (which was negative in the neutral position because of the magnetic flubs of the permanent magnet 94) to become greater negative, or South, in polarity.

At the same time, the electrical current causes the positive, or North, magnetic flux at pole end 120 (which was positive in the neutral position because of the magnetic flux of the permanent magnet 94) to decrease toward negative, or South, magnetic flux until the electromagnetically-caused negative magnetic flux cancels out the permanent magnet-caused positive magnetic flux at pole end 120. The electrical current also causes the negative, or South, magnetic flux at pole end 122 (which was negative in the neutral position because of the magnetic flux of the permanent magnet 94) to decrease toward positive, or North, magnetic flux until the electromagnetically-caused positive magnetic flux cancels out the permanent magnet-caused negative magnetic flux at pole end 122.

It can then be readily seen that the strong magnetic flux of poles 110 and 116 flows through magnets 80 and 82 to the backing plate 76, completing the magnetic circuit through that backing plate, and the strong magnetic attraction moves the magnetic array 74 leftwardly as seen in FIG. 4, engaging pole ends 110 and 116 with magnets 80 and 82 and magnetically latching the magnetic array to the backing plate 76. This is easily done, since the magnetic flux tending to flow through the drum hub 128 has been effectively canceled out and there is no magnetic attraction between the magnetic array 76 and the drum hub 128 tending to resist the leftward movement of the magnetic array.

The electrical current to the electromagnet coils around armatures 96 and 98 may then be cut off, and the magnetic flux of the magnetic array 74 remains magnetically shunted through the backing plate 76. The magnetic circuit established through the backing plate has substantially all of the magnetic flux of the permanent magnet 94 flowing through it, so that there is little or no magnetic force tending to attract the magnetic array 74 away from the backing plate 76 and toward the drum hub 128. Since the magnetic backing plate 76 is fixed against rotation, the magnetic array is held fixed in relation to the magnetic backing plate by the magnetic latching action. This is the released position of the parking brake assembly, insofar as the magnetic array is concerned.

When it is desired to apply the parking brake mechanism, the electrical circuit containing the windings around the electromagnet armatures 96 and 98 is electrically energized in the opposite direction so that poles 110 and 116 respectively have their magnetic fluxes changed negatively and positively, until their magnetic fluxes are of equal and opposite polarity to the magnetic flux of permanent magnet 94, while at the same time increasing the positive magnetic flux at pole end 120 and the negative magnetic flux at pole end 122. These last-named positive and negative magnetic fluxes become additive to the magnetic fluxes in pole ends 120 and 122 by the permanent magnet 94. The net effect is a reversal of the last-described electrical circuit energization. The strong magnetic attraction between the drum hub 128 and the pole end 120 and 122, concurrently with the substantially zero magnetic attraction between the backing plate 76 and the pole ends 110 and 116, causes the magnetic array to move rightwardly as shown in FIG. 4. The pole ends 120 and 122 magnetically engage the face 130 of the drum hub 128, and the magnetic circuit connecting these poles through the drum hub has most of the magnetic flux of the magnetic array 74 flowing through it. Thus the magnetic array is magnetically latched to the rotating, or rotatable, drum hub 128, so that the parking brake actuation arm is moved to the parking brake actuated position with slight rotation of the drum hub. The parking brake is then held in the applied position. This continues to be the case after the electrical current to the electromagnet windings 132 and 34 is once again cut off. The magnetic circuit continues to be shunted through the drum hub, and there is substantially no magnetic attraction tending to move the magnetic array 74 leftwardly toward the parking brake release position.

Figure 9:
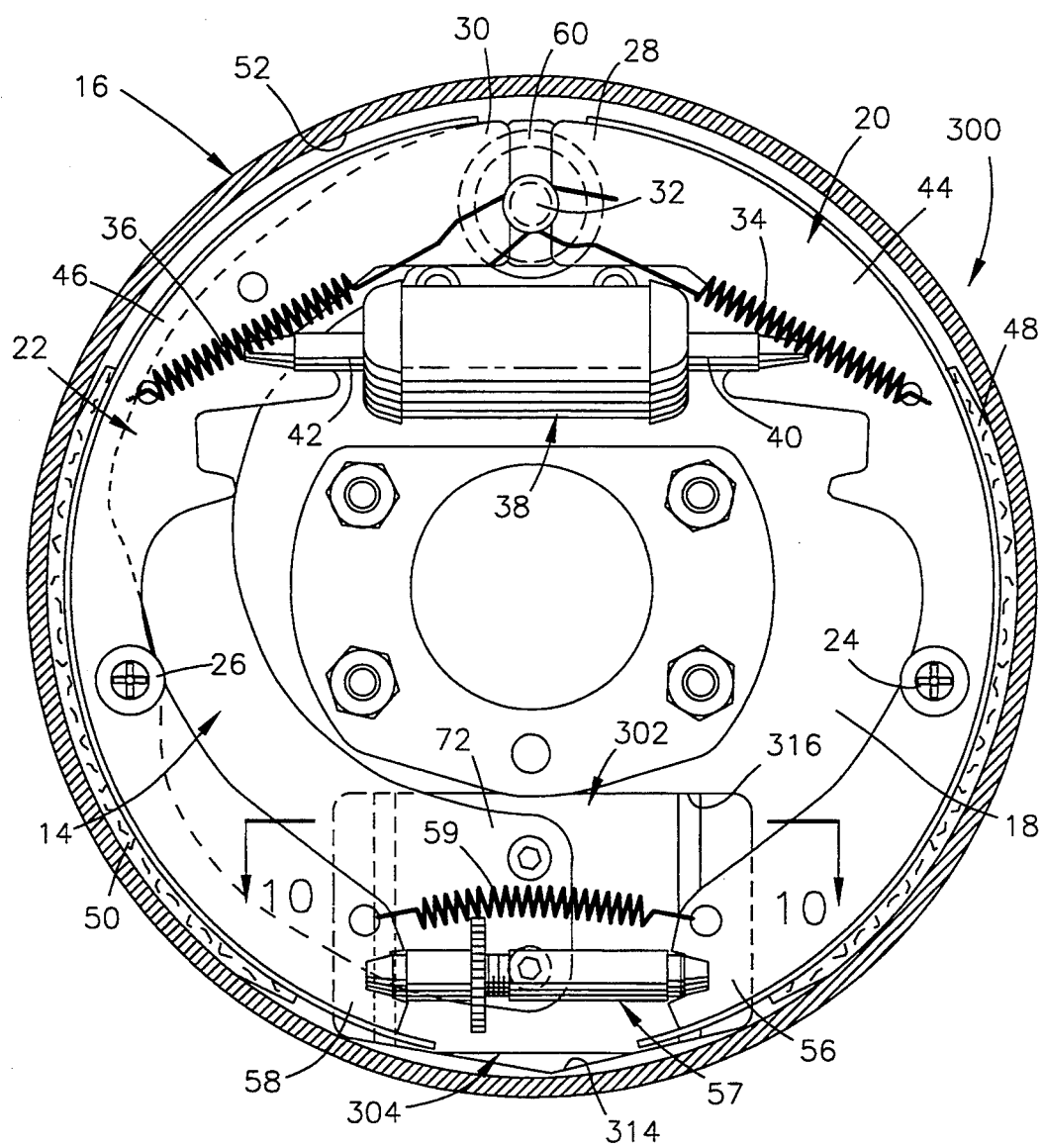
FIG. 9 is an elevation view of a brake assembly similar to the brake assembly of FIG. 1, having parts in section and showing a modified magnetic assembly on the end of the parking brake actuating arm.
Figure 10:
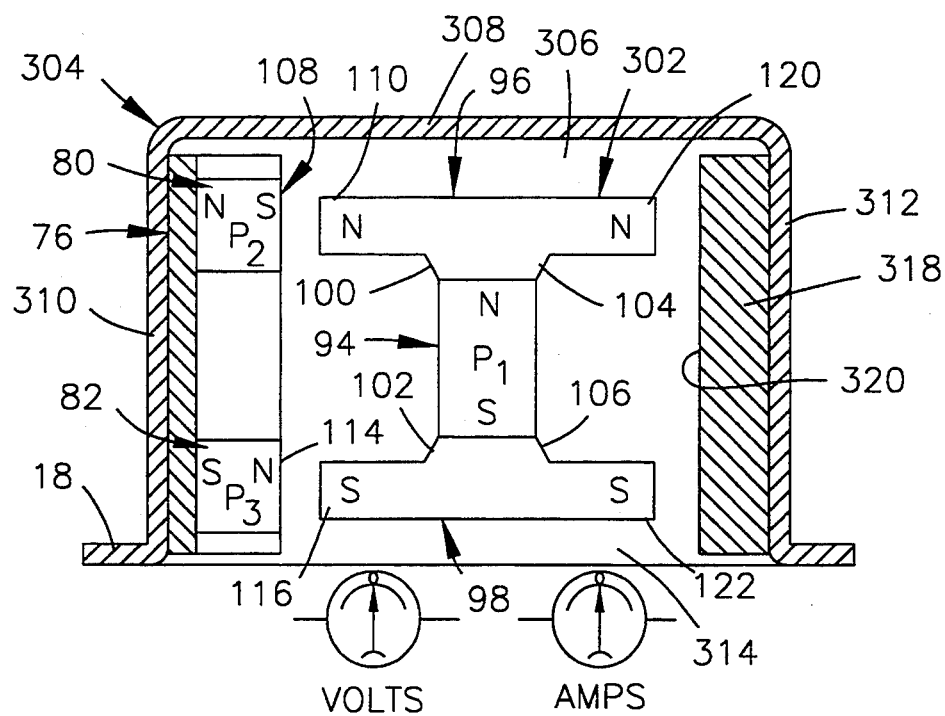
FIG. 10 is a simplified schematic cross section representation of the magnetic assembly of FIG. 9, taken in the direction of arrows 10—10 of FIG. 9.
Figure 11:
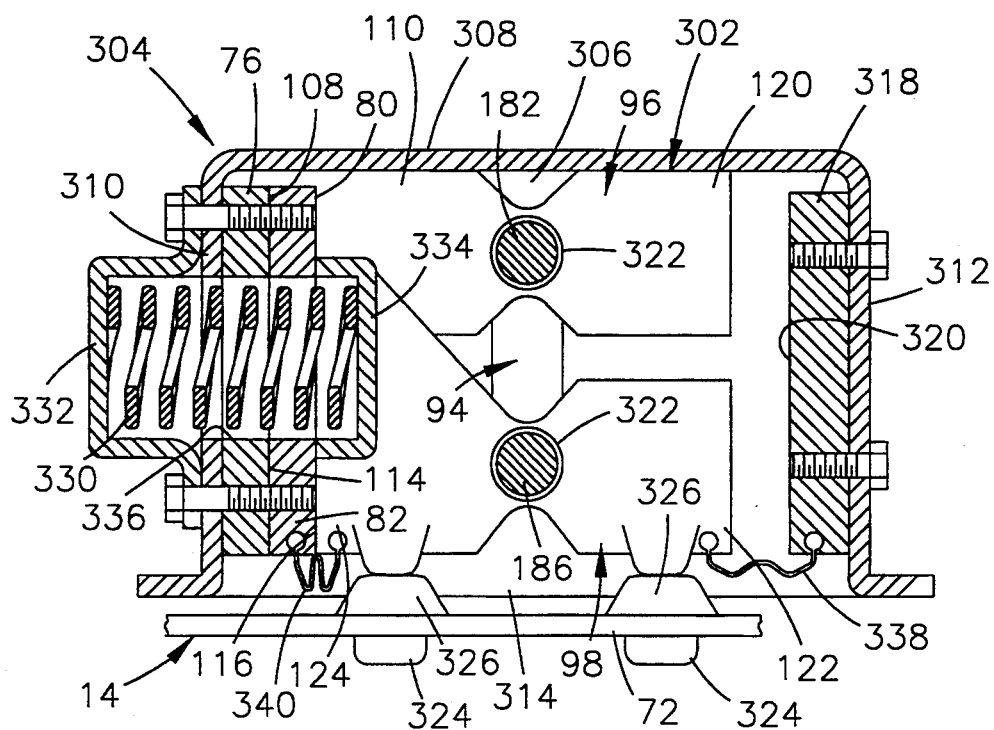
FIG. 11 is a cross section view also taken in the direction of arrows 11—11 of FIG. 9 and showing structure further including an optional helper spring.

A modification of the arrangements shown in FIGS. 1–8 is shown in FIGS. 9–11. It uses the magnetic forces of a similar magnetic array to move the parking brake activation arm into a parking brake apply-and-hold position from a released position, hold the parking brake activation arm in the parking brake applied position, to return the arm to the released position, and to hold the arm in the released position.

Instead of magnetically latching the magnetic array on the outer end of the parking brake activation arm to the rotatable drum hub and using the tendency of the vehicle wheel to exert the parking brake apply force to the activation arm, the magnetic array, and therefore the outer end of the parking brake activation arm, is moved by magnetic forces, under control of the vehicle operator, from the parking brake released position to the parking brake applied position. It is held in this position by the permanent magnet magnetic forces after the electromagnets are deenergized, keeping the parking brake applied.

When it is desired to release the parking brake, the electromagnets are again energized under control of the vehicle operator, with the magnetic forces generated being active to release the magnetic array from the applied position and forcibly return the parking brake activation arm, together with the magnetic array, to the parking brake released position. The magnetic array, and therefore the parking brake activation arm, are then magnetically latched in this position, and remain so even after the electromagnets of the magnetic array are deenergized. If desired, a spring arrangement may be incorporated to provide additional mechanically-exerted holding force for the parking brake applied mode.

FIG. 9 shows a duo servo drum brake similar to the brake mechanism shown in FIG. 1, with parts broken away and in section. However, it is a modified arrangement of the invention in which the resultant magnetic power selectively generated in the magnetic array provides the power for moving the parking brake activation arm into the parking brake applied position. The magnetic array also magnetically latches the end of the parking brake activation arm in the parking brake applied position. Similarly, selectively generated resultant magnetic power in the magnetic array provides power for moving the parking brake activation arm from the applied to the released position and magnetically latches the end of the parking brake activation arm in the parking brake released position.

The general arrangement of the standard brake parts of the brake assembly 300 of FIG. 9 is the same as that of the wheel brake assembly 10 of FIG. 1. Therefore, the same reference characters are used to indicate similar parts of assembly 300 which are also shown in assembly 10.

The brake drum 16 is secured to a vehicle wheel (not shown) for rotation with the wheel. The wheel in the typical automotive vehicle is a wheel on the rear axle. The brake assembly backing plate 18 is secured to the axle housing (not shown), as is well known in the art, so as to be relatively fixed against rotational movements in relation to the vehicle. Primary brake shoe 20 and secondary brake shoe 22 are mounted on the backing plate 18 by means of hold-down spring assemblies 24 and 26. The upper adjacent ends 28 and 30 of shoes 20 and 22 are in engaging relation with anchor pin 32, which is mounted on backing plate 18. Shoe return springs 34 and 36 are respectively attached to the shoes 20 and 22 at one spring end and to the anchor pin 32 at the other spring end. They are tensioned so as to continually urge the shoe ends 28 and 30 toward engagement with the anchor pin 32. Wheel cylinder 38 is mounted on the backing plate 18 and has its oppositely-extending pins 40 and 42 respectively engaging the webs 44 and 46 of the respective brake shoes 20 and 22, near but spaced from the brake shoe ends 28 and 30. The lower brake shoe ends 56 and 58 engage the ends of the brake shoe adjuster 57, and are held in such engagement by the spring tension force of the brake adjuster spring 59, in a manner well known in the art.

When brake actuating fluid pressure is introduced into the wheel cylinder 38, pins 40 and 42 are moved axially outward by the wheel cylinder pistons (not shown). These opposed outward movements effectively axially expand the wheel cylinder 38 and move the shoe ends 28 and 30 arcuately away from the anchor pin 32 until the brake shoe linings 48 and 50 engage the inner surface 52 of the brake drum 16. The primary shoe 20 then tends to move arcuately in the direction of rotation of the brake drum, indicated by arrow 54, with its other end 56 pushing through the brake adjuster screw assembly 57, causing the secondary shoe to move arcuately against wheel cylinder pin 42, again engaging the shoe end 30 with the anchor pin 32. Thus mechanical and hydraulic servo actions are obtained. As noted above with regard to FIG. 1, the brake may be of the leading-trailing type, with shoe ends 56 and 58 engaging a fixed anchor. The invention may be used with either type of drum brake.

In this typical drum brake, the service brake shoes are also actuatable by separate means for parking brake purposes. Typically, this includes a parking brake activation arm such as that generally described above in the detailed description of FIG. 1. In this FIG. 9, as in FIG. 1, a cam 60 is provided on the end of the parking brake activation arm 14 near the anchor pin 32. While this cam may be of several shapes as noted above, it is here illustrated somewhat schematically as a rectangular blade shape. The opposite sides of the cam 60 are engaged by the shoe ends 28 and 30. As the parking brake activation arm 14 is pivoted about the anchor pin, the shoe ends 28 and 30 are spread apart, engaging the shoe linings 48 and 50 with the drum inner surface 52 and actuating the brake in the parking brake mode.

In the brake 300 of FIG. 9, the parking brake activation arm 14 is located in close conjunction with the secondary brake shoe 22 in the same manner as in the brake 10 of FIG. 1. It is adjacent shoe web 46 of that shoe, and has a magnetic array 302 provided on its outer end 72. Magnetic array 302 is a part of the magnetic assembly 304. Assembly 304 is schematically shown in FIG. 10.

The magnetic array 302 of magnetic assembly 304 is illustrated as being arranged in the same manner as the magnetic array 74 of FIGS. 3 and 4. However it has been reoriented 90° about a vertically extending diameter of the brake assembly of FIG. 1 so that it is movable leftwardly and rightwardly as seen in FIGS. 9 and 10 instead of being moved inwardly and outwardly of the plane of view as is the magnetic array 74 in FIG. 1.

In FIG. 9, the backing plate 18 has been modified to provide a cup-like cavity 306 extending away from the drum hub, and is better shown in FIGS. 10 and 11. Cavity 306 is defined by a back wall 308, left and right side walls 310 and 312, bottom side wall 314 and a similar top side wall 316. As shown, left side wall 310 is in the vicinity of brake shoe end 58 and right side wall 312 is in the vicinity of brake shoe end 56. Magnetic array 302 is mounted in cavity 306. The magnetic array 302 is shown schematically in FIG. 10 as having a simple arrangement of one permanent magnet 94 and two electromagnet armatures 96 and 98. Magnetic backing plate 76 is secured to the cavity side wall 310. Another magnetic backing plate 318 is secured to the cavity side wall 312. Plate 318 is magnetically equivalent to the brake drum hub 128 of FIGS. 2 and 3. However, it is fixed to the fixed brake assembly backing plate 18 rather than to a rotatable member such as the brake drum. Magnetic backing plate permanent magnets 80 and 82 are similarly provided, as are the permanent magnet 94 and the electromagnet armatures 96 and 98 with their respective poles 110, 120 and 116, 122. The electromagnets are also provided with their respective electrical windings 132 and 134, not shown in FIG. 10.

The magnetic assembly 304 is illustrated in FIG. 10 with the magnetic array 302 in the "neutral" position described with respect to FIG. 4. The magnetic assembly 304 is illustrated in FIG. 11 as being in the parking brake applied position. It operates in the same manner as does magnetic assembly 12, moving the magnetic array 302 leftwardly as seen in FIGS. 9 and 10 when the parking brake mode is activated. In this instance, the magnetic forces generated by the permanent magnet 94 (and, in the four electromagnet arrangement of FIGS. 7 and 11, also permanent magnets 178, 182 and 186) combined with the magnetic forces generated by the electromagnet armatures 96 and 98 (and in FIGS. 7 and 11, also electromagnet armatures 170 and 174) are sufficiently strong to pivot the parking brake activation arm 14 clockwise as seen in FIG. 9, causing the cam 60 to spread the shoe ends 28 and 30 apart so that the brake is activated in the parking brake mode. Once the magnetic poles 110 and 116 contact the pole faces 108 and 110 of the backing plate permanent magnets 80 and 82 (and in FIG. 11 the comparable magnetic pole faces of electromagnets 170 and 174 contact the pole faces of the two additional permanent magnets comparable to permanent magnets 80 and 82 but positioned in line with those pole faces of electromagnets 170 and 174), the magnetic latching of the magnetic assembly in the parking brake activated mode takes place, and the electromagnets may be deenergized. The magnetic flux of the permanent magnets, and particularly permanent magnet 94 (and also permanent magnets 178,182 and 186 of FIGS. 7 and 11), is sufficient to hold the brake in the parking brake activated mode. As earlier noted, in this condition the magnetic flux from the permanent magnets is shunted through the magnetic backing plate 76, so that the plate 318 is subjected to substantially no magnetic flux from them.

Similarly, to release the parking brake, the electrical windings 132 and 134 of electromagnet armatures 96 and 98 of FIG. 10, or the similar electrical windings about electromagnet armatures 96, 98,170 and 174 of FIGS. 7 and 11, are electrically energized in the opposite polarity from the parking brake activation energization, pushing the magnetic array 302 rightwardly as seen in FIGS. 9, 10 and 11 by means of magnetic repulsion acting on magnetic backing plate 76 and permanent magnets 80 and 82 (and, in FIG. 11, also on the similar permanent magnets), together with magnetic attraction between electromagnetic poles 120 and 122 of electromagnet armatures 96 and 98 (and, in FIG. 11, also the similar poles of electromagnet armatures 170 and 174) and the magnetic backing plate 318. When poles 120 and 122 (and, in FIG. 11, also the similar poles of electromagnet armatures 170 and 174) contact the face 320 of magnetic backing plate 318, the magnetic array 302 is magnetically latched to that backing plate and the electromagnet armatures 96 and 98 (and 170 and 174 of FIG. 11) are deenergized. The magnetic flux of the permanent magnet 94 (and, in FIG. 11, the permanent magnets 178, 182 and 186) maintains the completed magnetic circuit through magnetic backing plate 318 and holds the parking brake activation arm 14 in the parking brake released position.

While the magnetic array 302 is shown schematically in FIG. 10 as having a simple arrangement of one permanent magnet 94 and two electromagnets armatures 96 and 98, it is shown in FIG. 11 as having the schematically-shown arrangement of FIG. 7. Thus, using the same reference characters for similar parts as found in FIG. 7, FIG. 11 shows permanent magnets 94, 182 and 186 and electromagnet armatures 96 and 98. Permanent magnet 178 of FIG. 7 is not shown in FIG. 11 because of the position of the section line indicated by arrows 10—10 in FIG. 9, those arrows also indicating the direction in which the view shown in FIG. 11 is taken. The electromagnet poles 110 and 120 of electromagnet armature 96 and electromagnet poles 116 and 122 of electromagnet armature 98 are also seen. In addition to those parts having the same reference characters as those in FIG. 7, non-magnetic protective sleeves 322 encase each of the permanent magnets 94, 170 (shown in FIG. 7 but not in FIG. 11), 182 and 186.

Magnetic backing plate 76 is secured to the cavity side wall 310. Another magnetic backing plate 318 is secured to the cavity side wall 312. Plate 318 is magnetically equivalent to the brake drum hub 128 of FIGS. 2 and 3. However, it is fixed to the fixed brake assembly backing plate 18 rather than to a rotatable member such as the brake drum. Magnetic backing plate permanent magnets 80 and 82 are shown and similarly provided. In addition, not being shown because of the section line along which FIG. 11 is taken, two more magnetic backing plate permanent magnets similar to magnets 80 and 82 are provided, and are in alignment with the adjacent pole faces of the poles of electromagnets 170 and 174 facing toward magnetic backing plate 76. The permanent magnets 94, 170, 182 and 186 of FIG. 7 are used in the structure shown in FIG. 11. The electromagnet armatures 96 and 98 with their respective poles 110, 120 and 116, 122 are also found in that structure, as well as electromagnets 170 and 174, their respective poles and electrical windings. The electromagnet armatures 96 and 98 are also provided with their respective electrical windings 132 and 134. For simplicity, however, none of the electrical windings are shown in FIG. 11. Nevertheless, they are present in the actual structure. In FIG. 11, the parking brake activation arm 14 has its end 72 secured to the magnetic array 302, preferably by non-magnetic fasteners 324 and non-magnetic spacers 326. Movements of the magnetic array 302 toward and away from the magnetic backing plates 76 and 318 therefore cause arm 14 to pivot and actuate or release the brake from the parking brake mode.

In FIG. 11, a helper spring 330, in the form of a coil compression spring, is contained between the spring cap 332 and the spring seat 334. A spring-receiving opening 336 is provided through magnetic backing plate 76 and the side wall 310. The group of permanent magnets 80 and 82, including the two others similar to them but not shown, are arranged outward of the opening 336 so that the spring 330 also passes through that magnet group. In being positioned as shown, spring 330 will apply its spring force so that it assists in releasing the parking brake as soon as some of the magnetic flux of the permanent magnets 94, 178, 182 and 186 is decreased by the electromagnets. At times it may be more desirable to have the spring 330 apply its spring force so that it assists in holding the parking brake in the applied position. In this case, opening 336 is made through the magnetic backing plate 318 and the end wall 312, with the spring cap being secured to end wall 312 instead of end wall 310, and the spring seat 334 being positioned near the poles 120 and 122 instead of near the poles 110 and 124. Also, dust seals 338 and 340 are secured over the spaces that contract and expand as the magnetic array 302 moves from the left to the right, and vice versa, during its parking brake apply and release movements.

Figure 12:
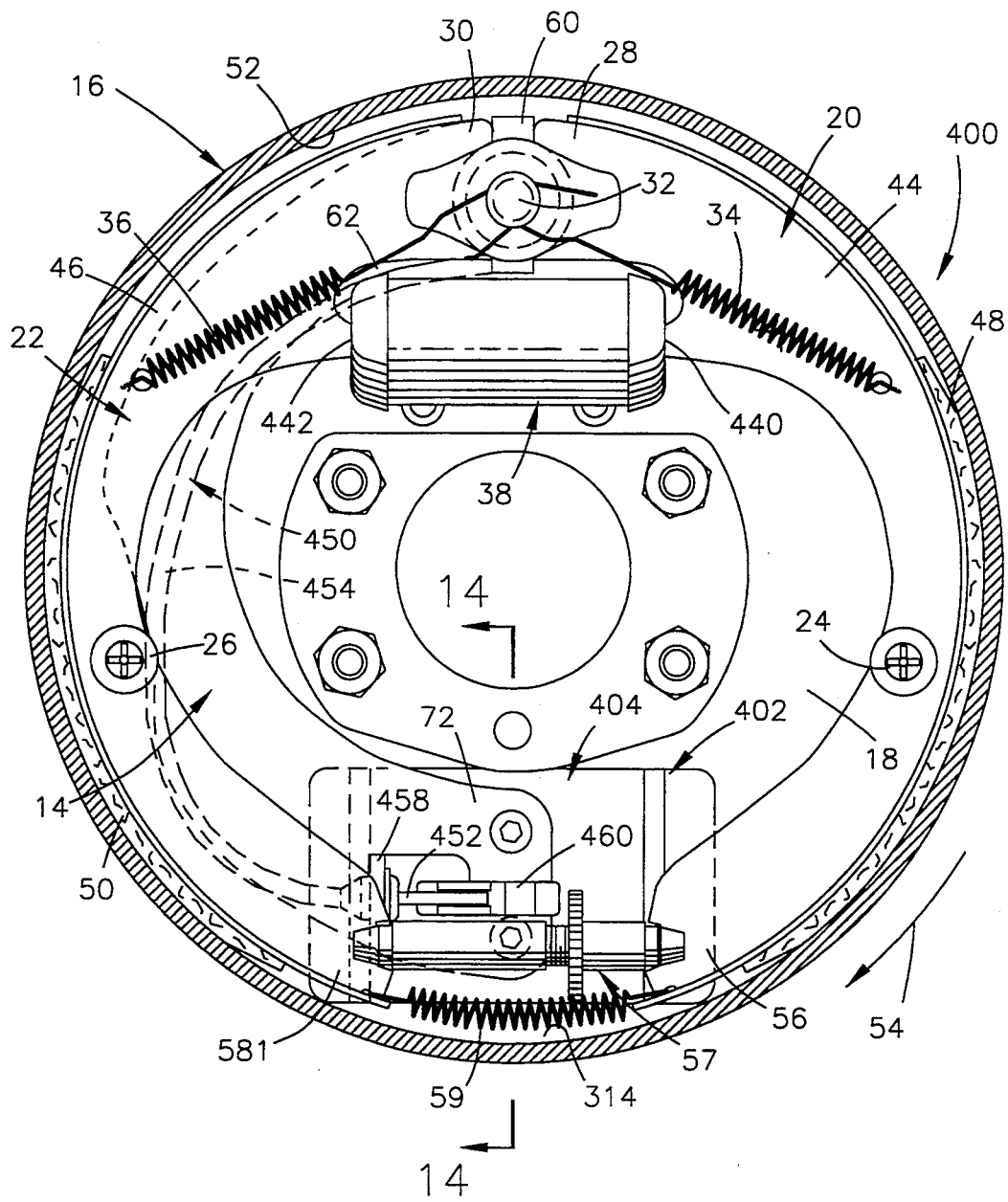
FIG. 12 is an elevation view, with parts in section, of a further modified brake assembly having the features of the brake assembly shown in FIGS. 9, 10 and 11 and additional features.
Figure 13:
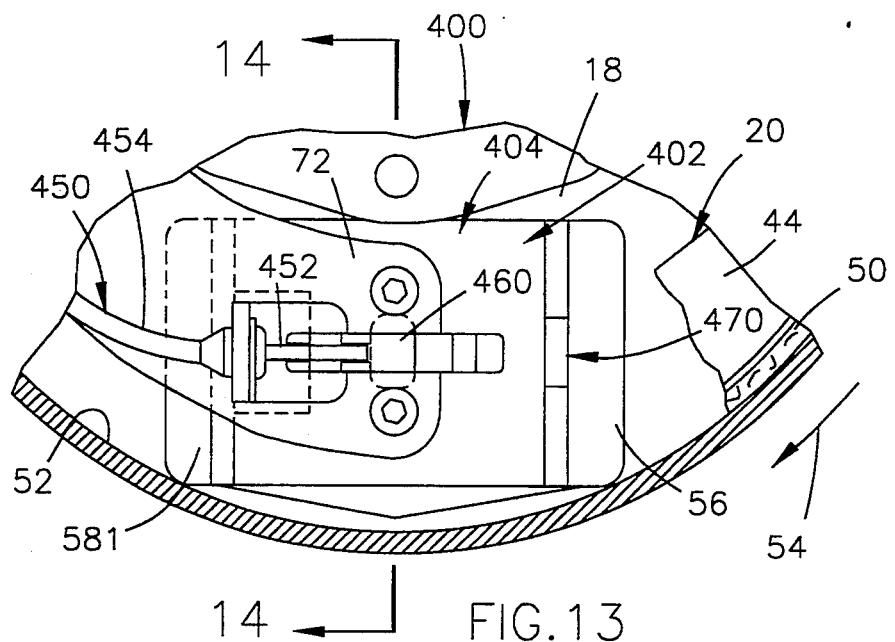
FIG. 13 is a fragmentary view of a portion of the brake assembly of FIG. 12, with parts broken away and in section, and with the same orientation as that FIGURE.
Figure 14:
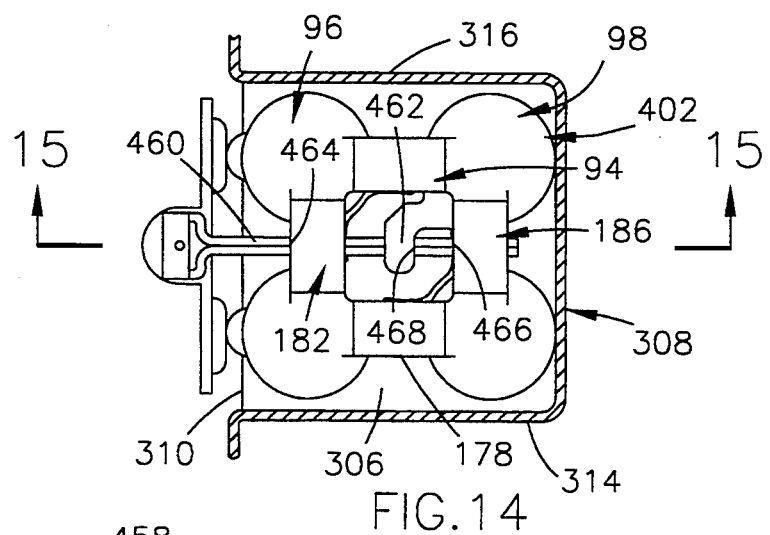
FIG. 14 is a cross section view of the magnetic assembly and the additional features of the brake assembly, taken in the direction of arrows 14—14 of FIG. 13.
Figure 15:
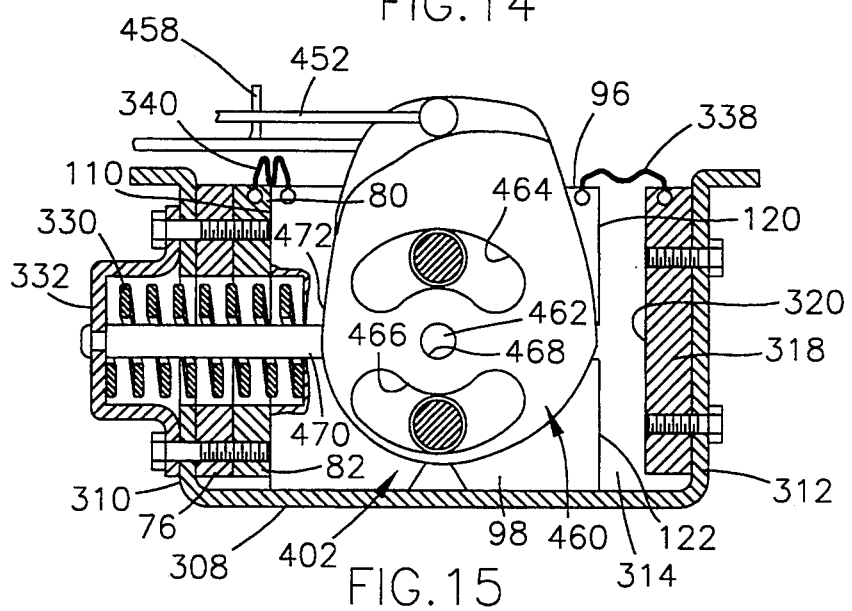
FIG. 15 is a cross section view of the magnetic assembly of FIG. 14, taken in the direction of arrows 15—15 of that FIGURE.

Brake assembly 400 of FIG. 12 is similar to brake assembly 300 of FIG. 9. It has the additional feature of a mechanical apply and release arrangement which may function as an assist or as a backup to the electromagnetic parking brake apply and release arrangement. FIG. 13 is a fragmentary view of the magnetic assembly portion of brake assembly 400 and the area in its immediate vicinity, the magnetic assembly connection with the mechanical apply and release mechanism being more clearly shown by removal of the brake shoe ends 56 and 58, the brake shoe adjuster 57, and the brake shoe adjuster spring 59 shown in FIG. 12. Otherwise, the view in FIG. 13 is the same presentation as that seen in FIG. 11. FIG. 14 is a cross section view of the magnetic assembly and parts of the mechanical apply and release mechanism of FIGS. 12 and 13. FIG. 15 is another cross section view of the magnetic assembly and parts of the mechanical apply and release mechanism of FIGS. 12 and 13.

The electromagnets of the magnetic array 402 are also provided with their respective electrical windings such as windings 132 and 134, schematically shown in FIG. 3 but omitted in all FIGURES thereafter for simplicity and clarity of view.

FIGS. 12, 13, 14 and 15 show a modification of the brake assembly of FIG. 9, in which a mechanical parking brake apply and release mechanism is incorporated in the magnetic apply and release mechanism. This mechanism can be either a backup system to the magnetic system, or can be an assist system which will require relatively little manual effort compared to the currently commonly used manual parking brake apply systems, or both.

The brake assembly 400 shown in FIGS. 12 and 13, as well as being shown in the partial assembly views of FIGS. 14 and 15, includes features shown in the brake assembly 300 of FIGS. 9 and 10. Because of this, the same reference characters are used where appropriate. Such elements include the parking brake activation arm 14, the brake drum 16, the brake assembly backing plate 18, the primary brake shoe 20, the secondary brake shoe 22, the hold-down spring assemblies 24 and 26, the upper adjacent ends 28 and 30 of shoes 20 and 22, the anchor pin 32, the shoe return springs 34 and 36, the wheel cylinder 38, extensions 440 and 442 formed on the brake shoe webs 44 and 46 and equivalent to the wheel cylinder pins 40 and 42 of the FIG. 9 disclosure, the shoe linings 48 and 50, the inner drum surface 52, arrow 54 showing a direction of rotation of the brake drum 16, the lower adjacent ends 56 and 58 of brake shoes 20 and 22, the cam 60 on the pivot end 62 of the parking brake activation arm 14, and the outer end 72 of the parking brake activation arm 14.

The magnetic array 402 of magnetic assembly 404 is illustrated as being arranged in the same manner as the magnetic array 302 FIGS. 9, 10 and 11. Also like magnetic array 302, it is movable leftwardly and rightwardly as seen in FIGS. 12 and 13 instead of being moved inwardly and outwardly of the plane of view as is the magnetic array 74 in FIG. 1.

Brake assembly 400 further includes a cable assembly 450 comprising a push-pull cable 452 slidably movable in a cable sheath 454. Cable assembly 450 is routed so as to enter the interior of the brake drum through a brake backing plate opening. It extends near the web 46 of brake shoe 22 to a position adjacent the parking brake activation arm end 72. A bracket 458, which may be struck out of the end 72 of the parking brake activation arm 14, receives the cable assembly through a bracket opening, and the cable sheath is anchored to the bracket. The cable 452 extends to a manual release and apply cam 460 which is pivotally mounted on a shaft 462. Shaft 462 is a part of the magnetic array 402, as shown in FIG. 14. Therefore, the cam 460 moves with the magnetic array 402, and the cam may be pivoted about shaft 462 by movements of the cable 452 in its sheath 454. As is best shown in FIG. 15, cam 460 has arcuate slots 464 and 466 formed in it on the opposite sides of the cam opening 468 through which shaft 462 is received. These slots receive the permanent magnets 182 and 186 therethrough so that the cam is permitted to be moved arcuately relative to those permanent magnets and shaft 462, and is supported by those permanent magnets. By using the diagonally opposite magnets, their poles being magnetically like poles, the magnetic field will not be degraded by what would otherwise be a magnetic shunt formed by the cam support. The helper spring seat 334 is supported in a similar manner with diagonally opposite magnetic poles forming the pocket for the seat. It is to be understood that the seat pocket so formed may be used as the spring seat. Again, this arrangement prevents degradation of the magnetic field because the diagonally opposite poles are magnetically like poles.

As shown in FIG. 15, a pin 470 is secured to and extends from the helper spring cavity extension cap 332 through the spring 330 toward the edge 472 of the cam 460. When the manual release/apply cam 460 is rotated (counterclockwise as seen in FIG. 15) by tension force applied through the cable 452, the cam contacts the pin 470. Continued rotation of the cam applies a force on the pin which in turn forces the magnetic array 402 rightwardly, away from the magnetic backing plate 76. This breaks the physical contact interface between the faces of the electromagnet armatures 96, 98,170, and 174, and the faces of the magnetic backing plate permanent magnets, interrupting the magnetic shunt from the magnetic array 402 through the magnetic backing plate 76. Preferably at about the same time that the magnetic array 402 has begun to receive separating force from the pin 470 due to the cam's shape and rotating action, the electromagnet windings of the magnetic array 402 have been energized to generate magnetic flux in a direction to at least decrease the magnetic attraction between the magnetic array 402 and the magnetic backing plate 76, and preferably further tends to magnetically repel the magnetic array 402 rightwardly as seen in FIG. 15 and therefore away from the magnetic backing plate 76. This further assists in causing the separation by adding the mechanical force, applied through cam action on the pin 470, and the magnetic repellant force, or at least by decreasing the magnetic attractive force between the magnetic array 402 and the magnetic backing plate 76 which must be overcome by the mechanical pin-applied camming force. Once separation has occurred and rightward movement continues, the magnetic attractive forces between the magnetic array 402 and the magnetic backing plate 76 immediately decrease, since the magnetic attractive force, if any, decreases in accordance with the square of the increasing distance separating the magnetic array and the magnetic backing plate 76 and its permanent magnets. Of course, they have already been so reversed that they have become repelling forces, which will also decrease in accordance with the square of the increasing distance noted. At the same time, however, the magnetic attractive force between the magnetic array 402 and the magnetic backing plate 318 will increase in accordance with the decreasing distance between the magnetic array 402 and the magnetic backing plate 318. Both the spring force of the expanding compression spring 330 and the now-increasing magnetic attractive force between the magnetic array 402 and the backing plate 318 move the magnetic array toward the parking brake released position until the faces of the electromagnets physically engage the backing plate face 320, establishing a magnetic shunt through that backing plate. Once this is established, the magnetic array electromagnets may be deenergized. The tension in the parking brake cable 452 may be released at any time after the interruption of the magnetic shunt through magnetic backing plate 76 has taken place. However, the entire step takes such a short time that it is usually not released until the magnetic shunt through magnetic backing plate 318 has been established. The magnetic flux from the permanent magnets continues the magnetic shunt and the magnetic attractive forces between the magnetic array 402 and the backing plate 318 are sufficient to hold the parking brake activation arm 14 in the parking brake released position. The cam 60 on the upper end 62 of the parking brake activation arm 14 is so positioned that the upper ends 28 and 30 of the brake shoes 20 and 22 again engage the anchor pin 32 under the tension forces of the brake shoe return springs 34 and 36.

When the parking brake is to be applied, the cam 460 has already moved in the reverse direction upon the release of tension in the parking brake cable 452 upon completion of the parking brake release as described above, removing the engagement of the pin 470 from the edge of the cam. Some slight tension may be applied to the parking brake cable 452 if the application of such tension is used to initiate the parking brake application. If that is not used, then other appropriate parking brake application action is taken. At that time, the electromagnet armatures of the magnetic array 402 are energized in a direction which decreases the magnetic attraction of the magnetic array 402 to the backing plate 318 and changes it to a magnetic repelling condition. This moves the magnetic array 402 leftwardly as seen in FIGS. 12, 13 and 15, with the magnetic attraction then being an attraction between the magnetic array and the backing plate 76. The magnetic array then contacts the permanent magnetic backing plate magnets, shunting the magnetic field from the magnetic array through magnetic backing plate 76 and reestablishing the parking brake applied position by having moved the parking brake activation arm in a clockwise pivotal direction as seen in FIG. 12. Any slight tension in the parking brake cable 452 at this time may be released.

If for any reason the magnetic array could not function with enough magnetic force to accomplish this reapplication of the parking brake, it is possible to move the parking brake activation arm 14 into the parking brake applied position by tensioning the parking brake cable 452 to rotate the cam 460 counterclockwise as seen in FIG. 15 until the cam edge is in jamming contact with the pin 470 such that the cam cannot rotate further. Further tension force moving the cable 452 leftwardly as seen in FIG. 15 will then manually move the entire magnetic array 402 and the parking brake activation arm end 72 leftwardly as seen in FIG. 12, mechanically applying the parking brake by mechanically moving the entire arm end, along with the magnetic assembly 404, without the magnetic force attraction normally causing parking brake application movement of the magnetic array 402 and the parking brake activation arm end 72.

In further explanation of the summaries of some aspects of the invention stated more generally above, the following explanations are provided.

In the magnetic flux matrix existing in the instance shown in FIG. 3, the magnetic flux circuit flows through permanent magnet 94, the left half of each of the electromagnet armatures 96 and 98 including pole ends 110 and 116, the engaged operating face defined by magnet faces 108 and 114, and the magnetic backing plate 76. When the magnetic array has the end faces of electromagnet pole ends 120 and 122 engaging the face 130 of the drum hub 128 (the magnetic array having moved rightwardly from the position illustrated in FIG. 3), the magnetic flux circuit flows through permanent magnet 94, the right half of each of the electromagnet armatures 96 and 98 including pole ends 120 and 122, the engaged operating face defined by face 130 of the drum hub 128, and that part of the drum hub 128 extending between the points of engagement of pole ends 120 and 122 with the drum hub. In both of these instances, the electromagnets are not electrically energized, and the magnetic flux matrix is dependent on the magnetic flux of the permanent magnet 94.

When the electromagnet coils 132 and 134 are electrically energized as described in detail above, with the magnetic assembly in the condition shown in FIG. 3, a second and different magnetic flux matrix is set up in place of the earlier described first magnetic flux matrix. In includes the magnetic flux of the permanent magnet 94 as well as the magnetic fluxes generated in the electromagnetic armatures 96 and 98 of FIG. 3. As described, this magnetic flux matrix, generated by a change in electromagnetic pole magnetic orientation, cancels the magnetic attractive forces between the magnetic array pole ends 110 and 116 and the magnetic backing plate 76 and preferably changes those forces to magnetic repelling forces urging the magnetic array rightwardly away from magnetic backing plate 76. At the same time, it generates magnetic attractive forces by change in electromagnet pole orientation, which forces attract the magnetic array to the drum hub 128, urging the magnetic array rightwardly toward the magnetic-flux-conductive part of the drum hub 128. Upon the rightward side engagement of the magnetic array with the drum hub, the electromagnets are deenergized and the second magnetic flux matrix is removed as the first magnetic flux matrix in reinstated. At this time, that matrix has its magnetic flux circuit completed through the engaged part of the drum brake hub 128, the rightward ends of the electromagnet armatures 96 and 98, and the permanent magnet 94, as above described.

A third magnetic flux matrix, similar to the second one but magnetically opposite to it, is set up when the electromagnets are energized to move the magnetic array leftwardly as seen in FIG. 3 from the above-described rightward engagement of the magnetic array with the drum hub 128. Its magnetic flux cancels the magnetic attraction between the magnetic array 74 and the drum hub 128, and may generate magnetic repelling forces acting therebetween, as well as generating magnetic attraction forces between the magnetic array 74 and the magnetic backing plate 76. These magnetic forces move the magnetic array leftwardly until it is again in the position shown in FIG. 3. The electromagnets are then deenergized and the first magnetic flux matrix is again set up, with its magnetic flux circuit again flowing through the magnetic backing plate 76.

In the summary of a feature of the invention in which a permanent magnet and two electromagnet armatures form an "I" configuration, the following additional details are pertinent. The ends of the armatures which extend in one direction (for example, leftwardly as seen in FIGS. 3 and 4), terminate in one common plane. Such a common plane is the one in which the end faces of pole ends 110 and 116 lie in FIGS. 3 and 4. The ends of the armatures which extend in opposite direction (rightwardly as seen in FIGS. 3 and 4) terminate in a another common plane. Such a common plane is the one in which the end faces of pole ends 120 and 122 lie in FIGS. 3 and 4. As seen in those FIGURES, the armature ends 110 and 116, and 120 and 122, define at least in part opposed sides of the magnetic array 74. These opposed sides are the left and right sides of the magnetic array as seen in FIGS. 3 and 4. The left one of those sides is adapted to be selectively in physical engagement with and selectively magnetically latched to the fixed member, which is magnetic backing plate 76 of FIGS. 3 and 4 and the brake backing plate 18 of FIG. 1, for example. The other side of the magnetic array (the right side as seen in FIGS. 3 and 4) is adapted to be selectively in physical engagement with and selectively magnetically latched to the movable member, which is the drum hub 128 as shown in FIGS. 3 and 4.

I claim:

1. A magnetic latch mechanism comprising a first member, a fixed member, a movable member movable relative to said fixed member and said first member, and a magnetic array forming a part of said first member, said magnetic array having controllable magnetic characteristics for moving said magnetic array between said first and second member latching positions by magnetically attractive forces acting between said magnetic array and the one of said fixed and movable members toward which said magnetic array is moving, said magnetic latching mechanism having first and second alternate stable conditions which respectively include said first and second magnetic latching positions, said first alternate stable condition including said first magnetic latching position in which said first member is magnetically latched only to said fixed member by magnetic attraction between said magnetic array and said fixed member, and said second alternate stable condition including said second magnetic latching position in which said first member is magnetically latched only to said movable member by magnetic attraction between said magnetic array and said movable member.

2. The magnetic latch mechanism of claim 1 in which during at least a part of the movement of said magnetic array toward said fixed member from said movable member, and vice versa, there are magnetic attraction forces between said magnetic array and the one member toward which said magnetic array is moving and there are magnetic repelling forces between said magnetic array and the one member from which said magnetic array is moving, said magnetic attraction and repelling forces acting in concert to at least in part cause said movements, and means for selectively generating said magnetic attraction and repelling forces.

3. The magnetic latch mechanism of claim 1 further comprising a control circuit having
  means controlling the presence or absence and, when present, the strength and direction of, the effective magnetic flux of said magnetic array,
  and sensing means for sensing the existence of at least one of said alternate stable conditions.

4. The magnetic latch mechanism of claim 1 in which said magnetic array comprises
  a plurality of magnets arranged to define a first magnetic matrix having magnetic flux characteristics in accordance with the polar arrangement and interrelated physical positioning of said magnets.

5. The magnetic latch mechanism of claim 1 in which said magnetic array comprises
  a plurality of magnets arranged to define a plurality of magnetic matrices having magnetic flux characteristics in accordance with the polar arrangement, polar magnetic orientation and interrelated physical positioning of said magnets,
  at least one of said plurality of magnets being selectively subject to changes in polar magnetic orientation, and by such changes cause different defined magnetic matrices to be selected,
  said changes in polar magnetic orientation being accomplished by electrical control of the magnetic flux therein, and means providing said electrical control.

6. The magnetic latch mechanism of claim 1 in which said magnetic array comprises
  a plurality of permanent magnets arranged to define a first magnetic matrix having predetermined magnetic flux characteristics in accordance with the polar arrangement and interrelated physical positioning of said permanent magnets.

7. The magnetic latch mechanism of claim 1 in which said magnetic array comprises
  a plurality of permanent magnets and magnetically soft electromagnet armatures,
  said armatures being magnetically and physically interconnected with said permanent magnets at the pole ends of said permanent magnets so as to be magnetically effective parts of said permanent magnets,
  said permanent magnets and said armatures being arranged to define a first magnetic matrix having predetermined magnetic flux characteristics in accordance with the polar arrangement and interrelated physical positioning of said permanent magnets.

8. The magnetic latch mechanism of claim 7 in which said permanent magnets and said armatures are rod-like in shape with the magnetic north and magnetic south poles of each permanent magnet being at opposite ends thereof,
  and each of said permanent magnets has one armature secured to its north magnetic pole and another armature secured to its south magnetic pole,
  said armatures extending transversely of said permanent magnets to form a substantially "I" configuration with the ends of the armatures which extend in one direction terminating in one common plane and the ends of the armatures which extend in opposite direction terminating in a another common plane,
  said armature ends defining at least in part opposed sides of said magnetic array,
  one of said sides being adapted to be selectively in physical engagement with and selectively magnetically latched to said fixed member
  and the other of said sides being adapted to be selectively in physical engagement with and selectively magnetically latched to said movable member.

9. The magnetic latch mechanism of claim 1 in which said magnetic array comprises
  a plurality of permanent magnets arranged to define a first magnetic matrix having predetermined magnetic flux characteristics in accordance with the polar arrangement and interrelational physical positioning of said permanent magnets,
  a plurality of electromagnets having magnetically soft armatures magnetically interconnected with said permanent magnets at the pole ends of said permanent magnets and defining physical parts of said first magnetic matrix,
  said permanent magnets each having electrically conductive wire coils about their respective armatures, said coils being selectively electrically energizible and deenergizible at predetermined strengths and directions of electrical current flow to modify said predetermined magnetic flux characteristics of said first magnetic matrix when energized so as to establish magnetically different second and third magnetic matrices employing said permanent magnets and said energized electromagnets,
  said electromagnet armatures being magnetically soft and therefore characterized by retaining only minimal residual magnetism generated by energization of their electrically conductive coils, once and while said electrically conductive coils associated therewith are electrically deenergized.

10. The magnetic latch mechanism of claim 9 in which said fixed member has a first magnetic-flux-conductive portion positioned in physical alignment with a first side of said magnetic array for selective magnetic latching and releasing engagement therewith
  and said movable member has a second magnetic-flux-conductive portion positioned in physical alignment with a second side of said magnetic array for selective magnetic latching and releasing engagement therewith,
  the effective magnetic flux of said magnetic array based only on the magnetism of said permanent magnets establishing a first closed magnetic flux circuit flowing substantially only through and between said magnetic array first magnetic matrix and said first magnetic-flux-conductive portion when said first side of said magnetic array is in physical and magnetic engagement with said first magnetic-flux-conductive portion and said electromagnets are deenergized,
  the effective magnetic flux of said magnetic array based only on the magnetism of said permanent magnets establishing a second closed magnetic flux circuit flowing substantially only through and between said magnetic array first magnetic matrix and said second magnetic-flux-conductive portion when said second side of said magnetic array is in physical and magnetic engagement with said second magnetic-flux-conductive portion and said electromagnets are electrically deenergized.

11. The magnetic latch mechanism of claim 1 in which
  said first member is the parking brake actuating arm of a brake assembly, said fixed member is operatively a part of the backing plate of the brake assembly, and said movable member is a part of the rotatable part of the brake assembly to be selectively braked.

12. In a brake assembly having a service braking mode and a parking brake mode of operation, said brake assembly having a fixed backing plate, brake shoes operatively mounted on said backing plate for brake engaging and disengaging movements, a rotatable brake drum having a hub portion which is substantially parallel to said backing plate and has an annular drum friction braking surface thereon adapted to be selectively in brake engaging and disengaging relation with said brake shoes, means when actuated for selectively moving said brake shoes into and out of friction braking relation with said drum friction braking surface for service braking, other means including a parking brake actuating arm operatively pivotally mounted on said backing plate, and brake shoe spreadable means operatively mounted on said backing plate and engaging said brake shoes, said brake shoe spreadable means being separately actuatable by pivotal movements of said parking brake actuating arm to move said brake shoes into and out of friction braking relation with said drum friction braking surface for parking brake actuation and release of said brake assembly, the improvement comprising:

a magnetic latch mechanism comprising a first member including said parking brake actuating arm, a fixed member formed as an operable part of said backing plate, and a movable member having an annular surface and defined by an operable part of the hub part of said brake drum, said movable member being rotatably movable relative to said fixed member and said first member, and a magnetic array forming a part of said first member and mounted on said parking brake actuating arm, said magnetic array be positioned between said backing plate and said movable member annular surface and having controllable magnetic characteristics for moving said magnetic array between said first and second member latching positions by magnetically attractive forces acting between said magnetic array and the one of said fixed and movable members toward which said magnetic array is moving, said magnetic latch mechanism having first and second alternate stable conditions which respectively include said first and second magnetic latching positions, said first alternate stable condition including said first magnetic latching position in which said first member is magnetically latched only to said fixed member by magnetic attraction between said magnetic array and said fixed member and said parking brake actuating arm is in the parking brake released position, and said second alternate stable condition including said second magnetic latching position in which said first member is magnetically latched only to said movable member annular surface by magnetic attraction between said magnetic array and said movable member, the tendency of continued rotation of the brake drum creating a force transferred through said magnetic array to said parking brake actuating arm causing said arm to be rotated to the parking brake actuated position and holding said arm in that position until it is released.

13. A magnetic latch mechanism comprising a first member, a second member and a third member, at least one of said members being movable and at least one of said members being fixed, all of said members being capable of having magnetic flux passing therethrough, and at least one of said members including a magnetic array comprising a plurality of magnets, at least two of said plurality of magnets being controllable electromagnets each having a magnetic armature, said at least two controllable electromagnets being selectively energizable to provide different electromagnet magnetic polar orientations of said armatures and different magnetic fluxes in said armatures, said electromagnets being selectively deenergizable to provide no electromagnet magnetic polar orientations of said armatures based on magnetic flux therein which is electromagnetically generated, and at least another one of said plurality of magnets being a permanent magnet positioned in magnetically cooperative relationship with said at least two controllable electromagnets, said magnetic latch mechanism having a first and second alternately establishable stable conditions which respectively include first and second magnetic latching positions of said magnetic latch mechanism, said first magnetic latching position magnetically latching said member which includes said magnetic array to one of the other of said members by the magnetic flux of said at least one permanent magnet, said second magnetic latching position magnetically latching said member which includes said magnetic array to the other one of the other of said members by the magnetic flux of said at least one permanent magnet, the magnetic polar orientations of said at least two electromagnet armatures and the magnetic flux created therein during energization of said at least two electromagnets modifying the effect of the magnetic flux of said at least one permanent magnet to cancel the magnetic latching effect of the magnetic flux magnetically latching said member which includes said magnetic array to another one of said members in one of said first and second magnetic latching positions and generate magnetic attractive forces attracting and moving said magnetic array to the remaining another one of said members from said another one of said members for magnetic latching engagement with said remaining another one of said members, said at least one electromagnet then being deenergized so that the other of said first and second magnetic latching positions is established, said member which includes said magnetic array then being magnetically latched to said remaining another one of said members by the magnetic flux of said at least one permanent magnet.

14. The mechanism of claim 13 in which said first member is a fixed member and said second member is a movable member movable into and away from operative contact with each of said first and third members.

15. The mechanism of claim 14 in which said third member is also a movable member, the movements of each of said second and third members being in planes that are substantially perpendicular to each other.

16. The mechanism of claim 14 in which said third member is also a fixed member.

17. The mechanism of claim 14 in which said second member includes said magnetic array, said magnetic array having oppositely disposed first and second magnetically engageable faces and said first and third members respectively have third and fourth magnetically engageable faces
wherein and when said first member and said second member are magnetically latched together said first and third magnetically engageable faces are magnetically engaged with each other,
and wherein and when said second member and said third member are magnetically latched together said second and fourth magnetically engageable faces are magnetically engaged with each other.

18. The mechanism of claim 17 further including a rotatable member and a fixed member to be selectively operatively secured together by the latching action of said magnetic latch mechanism in said second one of said two stable conditions so as to inhibit rotational movements of said rotatable member relative to said fixed member, said first member being fixed to said fixed member.

19. The mechanism of claim 18 in which said member which includes said magnetic array further including a brake actuating lever for actuating a brake when said magnetic array is moved toward said second magnetic latching position from said first magnetic latching position, and then when said second magnetic latching position is established holding said brake applied to inhibit said rotational movements of said rotatable member when said second one of said two stable conditions exists.

20. The mechanism of claim 18 further including brake means for braking and releasing said rotatable member and brake means actuating and releasing linkage connecting said second member and said brake means so that when said first member is magnetically latched to said second member said brake means is released and said rotatable member is free to rotate insofar as said brake means is concerned, and when said second member is magnetically latched to said third member said linkage actuates said brake means and applies braking force to said rotatable member which brakes said rotatable member against rotation.

21. The mechanism of claim 20 in which said third member is an operative part of said rotatable member and said rotatable member is a brake drum which is a part of said brake means.

22. The mechanism of claim 20 in which said rotatable member is a brake drum which is a part of said brake means, and said brake means further includes
a fixed backing plate,
brake shoes movably mounted on said fixed backing plate for movements into and out of braking engagement with said brake drum,
first brake actuating means operable to apply said brake means as service brakes in a vehicle,
and second brake actuating means operable to apply, hold and release said brake means as a parking brake,
said second brake actuating means comprising linkage operatively connected to said brake shoes for causing brake actuating and release movements thereof,
said linkage including a parking brake actuating lever having one end pivotally mounted on said fixed backing plate and movable from a parking brake released position to a parking brake applied position, said parking brake actuating lever being at least a part of said second member,
said first and third members being operatively fixed to said fixed backing plate in angularly spaced relation with said magnetic array, which is mounted on the other end of said parking brake actuating lever from its pivotally mounted end, being received between said first and third members,
said magnetic array being movable to one of said first and second magnetic latching positions from the other of said first and second magnetic latching positions to engage and be magnetically latched with said first member to hold said parking brake actuating lever in the parking brake released position,
said magnetic array also being movable to said other of said first and second magnetic latching positions from said one of said first and second magnetic latching positions to engage and be magnetically latched with said third member to hold said parking brake actuating lever in the parking brake applied position.

23. The magnetic latching mechanism of claim 22 in which said parking brake actuating means includes
separate parking brake cable apply and release means operatively secured to said parking brake actuating lever and capable of applying parking brake apply force thereto when tensioned to at least assist the magnetic attracting forces urging the magnetic array toward magnetic latching engagement with said third member in applying said parking brake.

24. The magnetic latching mechanism of claim 22 in which spring means operatively exerts spring force on said magnetic array to urge said magnetic array from one of said magnetic latching positions to the other of said magnetic latching positions.

25. The method of selectively and alternatively magnetically moving a first member and latching the first member to a second member or a third member, said method comprising the steps of:
(1) providing a magnetic-flux-conductive part of each of the second and third members;
(2) establishing a permanent magnetic flux within a part of the first member;
(3) selectively establishing and disestablishing an electromagnetic magnetic flux within a part of the first member which when established is in magnetic flux interactive relation with the permanent magnetic flux, the electromagnetic flux when established being selectively of predetermined first or second magnetic polar orientations;
(4) the electromagnetic magnetic flux, when having the first magnetic polar orientation established, modifying the effect of the permanent magnetic flux so the net effective magnetic flux magnetically attracts the first member into magnetic and operable physical engagement with the magnetic-flux-conductive part of the second member and causes magnetic and operable physical disengagement from the magnetic-flux-conductive part of the third member;

(5) upon the magnetic and operable physical engagement of the first member with the magnetic-flux-conductive part of the second member, disestablishing the electromagnetic flux and reestablishing the permanent magnetic flux as the only active magnetic flux, the permanent magnetic flux then having a completed magnetic flux circuit through the magnetic-flux-conductive part of the second member and the part of the first member in which the permanent magnetic flux is established;

(6) thereafter reestablishing the electromagnetic magnetic flux with the second magnetic polar orientation, that electromagnetic magnetic flux again modifying the effect of the permanent magnetic flux so the net effective magnetic flux magnetically now attracts the first member into magnetic and operable physical engagement with the magnetic-flux-conductive part of the third member and causes magnetic and operable physical disengagement of the first member from the magnetic-flux-conductive part of the second member;

(7) and, upon the magnetic and operable physical engagement of the first member with the magnetic-flux-conductive part of the third member, disestablishing the electromagnetic flux and reestablishing the permanent magnetic flux as the only active magnetic flux, the permanent magnetic flux then having a completed magnetic flux circuit through the magnetic-flux-conductive part of the third member and the part of the first member in which the permanent magnetic flux is established.

26. The method of claim 25 in which in step (4) when the effective magnetic flux causes magnetic and operable physical disengagement of the first member from the magnetic-flux-conductive part of the third member, it creates a magnetic repelling force acting to urge the first member away from the third member.

27. The method of claim 26 in which in step (6) when the effective magnetic flux causes magnetic and operable physical disengagement of the first member from the magnetic-flux-conductive part of the second member, it creates a magnetic repelling force acting to urge the first member away from the second member.

28. The method of claim 25 comprising a step concurring with at least one of steps (4) and (6) and assisting in the magnetic and operable physical disengagement of the first member from one of the second and third members by mechanical force application to the first member.

* * * * *